(12) United States Patent
Colborn

(10) Patent No.: US 6,522,955 B1
(45) Date of Patent: Feb. 18, 2003

(54) SYSTEM AND METHOD FOR POWER MANAGEMENT

(75) Inventor: Jeffrey A. Colborn, Cardiff-by-the-Sea, CA (US)

(73) Assignee: Metallic Power, Inc., Carlsbad, CA (US)

( * ) Notice: Subject to any disclaimer, the term of this patent is extended or adjusted under 35 U.S.C. 154(b) by 0 days.

(21) Appl. No.: 09/627,742

(22) Filed: Jul. 28, 2000

(51) Int. Cl.[7] ............................ G05B 11/00; H01M 8/18
(52) U.S. Cl. ...................... 700/286; 307/10.1; 429/19; 429/22
(58) Field of Search ................................. 700/286, 295, 700/297; 307/9.1, 10.1; 429/22, 23, 29

(56) References Cited

U.S. PATENT DOCUMENTS

| | | | |
|---|---|---|---|
| 3,440,098 A | 4/1969 | Stachurski | 136/6 |
| 3,451,851 A | 6/1969 | Stanimirovitch | 136/30 |
| 3,639,173 A | 2/1972 | Stachurski | 136/3 |
| 3,660,170 A | 5/1972 | Rampel | 136/154 |
| 3,663,298 A | 5/1972 | McCoy et al. | 136/31 |
| 3,716,413 A | 2/1973 | Eisner | 136/86 |
| 3,767,466 A | 10/1973 | McCoy et al. | 136/131 |
| 3,811,952 A | 5/1974 | Lennart et al. | 136/86 |
| 3,847,671 A | 11/1974 | Leparulo et al. | 136/86 |
| 3,902,918 A | 9/1975 | Pompon | 136/86 |
| 3,911,284 A * | 10/1975 | Skala | 290/4 |
| 3,930,882 A | 1/1976 | Ohsawa et al. | 136/30 |
| 3,944,430 A | 3/1976 | Lee | 136/30 |
| 3,970,472 A | 7/1976 | Steffensen | 136/3 |
| 3,981,747 A | 9/1976 | Doniat et al. | 429/15 |

(List continued on next page.)

FOREIGN PATENT DOCUMENTS

| | | | |
|---|---|---|---|
| EP | 0755088 A2 | * | 1/1997 |
| FR | 2639767 | | 11/1988 |
| FR | 2669775 | | 11/1990 |
| JP | 51-494439 | | 4/1976 |
| WO | 01-28017 A2 | * | 4/2001 |

OTHER PUBLICATIONS

Cooper, J., et al.; *Demonstration of a Zinc/Air Fuel Battery to Enhance the Range and Mission of Fleet Electric Vehicles: Preliminary Results in the Refueling of a Multicell Module*; 29th Intersociety Energy Conversion Engineering Conference; Aug. 8, 1994; 8 pages.

Cooper, J., et al., *A Refuelable Zinc/Air Battery for Fleet Electric Vehicle Propulsion* SAE Technical Paper Series No. 951948; Aug. 7–10, 1995; pp. 137–143.

Cooper, J.; *How the Zinc/Air Battery is Refueling the Competitiveness of Electric Vehicles*; Science & Technology Review; Oct. 1995; pp. 7–13.

*Primary Examiner*—Paul P. Gordon
(74) *Attorney, Agent, or Firm*—Howrey Simon Arnold & White

(57) ABSTRACT

A system and method for power management is described that provides for monitoring and controlling a regenerative fuel cell and at least one powered device. The power management system includes a communication interface to facilitate data transmission, a communication device for monitoring and controlling a regenerative fuel cell and at least one powered device, the communication device providing for sending data to and receiving data from at least one powered device over a communication interface, a regenerative fuel cell for providing storage and supply of electricity, and a power interface for allowing electricity generated by the regenerative fuel cell to power at least one powered device.

114 Claims, 12 Drawing Sheets

U.S. PATENT DOCUMENTS

| | | | |
|---|---|---|---|
| 3,985,581 A | 10/1976 | Zbigniew et al. ............. | 429/51 |
| 4,074,028 A | 2/1978 | Will ........................ | 429/105 |
| 4,145,482 A | 3/1979 | Von Benda ................. | 429/27 |
| 4,172,924 A | 10/1979 | Warszawski ................ | 429/15 |
| 4,218,521 A | 8/1980 | Putt et al. .................... | 429/39 |
| 4,287,273 A | 9/1981 | Harney et al. .............. | 429/153 |
| 4,415,636 A | 11/1983 | Charkey ...................... | 429/27 |
| 4,479,856 A | 10/1984 | Ando .......................... | 204/55 |
| 4,563,403 A | 1/1986 | Julian ......................... | 429/198 |
| 4,730,153 A | 3/1988 | Breting et al. ............... | 320/14 |
| 4,731,547 A | 3/1988 | Alenduff et al. ............. | 307/85 |
| 4,802,100 A | 1/1989 | Aasen et al. ................ | 364/494 |
| 4,842,963 A | 6/1989 | Ross ........................... | 429/21 |
| 4,855,030 A | 8/1989 | Miller ......................... | 204/212 |
| 5,006,424 A | 4/1991 | Evans et al. ................. | 429/15 |
| 5,188,911 A | 2/1993 | Downing et al. ............ | 429/70 |
| 5,312,699 A | 5/1994 | Yanagi et al. ................ | 429/22 |
| 5,316,869 A | 5/1994 | Perry, Jr. et al. ............. | 429/19 |
| 5,318,861 A | 6/1994 | Harats et al. ................ | 429/21 |
| 5,346,778 A * | 9/1994 | Ewan et al. .................. | 429/19 |
| 5,348,820 A | 9/1994 | Suga et al. ................... | 429/216 |
| 5,360,680 A | 11/1994 | Goldman et al. ............ | 429/27 |
| 5,366,829 A | 11/1994 | Saidi ........................... | 429/216 |
| 5,369,353 A | 11/1994 | Erdman ...................... | 323/207 |
| 5,378,329 A | 1/1995 | Goldstein et al. ........... | 204/115 |
| 5,382,482 A | 1/1995 | Suga et al. ................... | 429/206 |
| 5,401,589 A | 3/1995 | Palmer et al. ................ | 429/13 |
| 5,427,872 A | 6/1995 | Shen et al. ................... | 429/142 |
| 5,432,710 A | 7/1995 | Ishimaru et al. ............. | 364/493 |
| 5,434,020 A | 7/1995 | Cooper ........................ | 429/210 |
| 5,434,021 A | 7/1995 | Fauteux et al. .............. | 429/213 |
| 5,441,820 A | 8/1995 | Siu et al. ...................... | 429/17 |
| 5,462,815 A | 10/1995 | Horiuchi et al. .............. | 429/13 |
| 5,476,293 A | 12/1995 | Yang ............................ | 290/4 |
| 5,500,561 A | 3/1996 | Wilhelm ...................... | 307/64 |
| 5,547,778 A | 8/1996 | Fauteux et al. ............... | 429/81 |
| 5,558,947 A | 9/1996 | Robinson ..................... | 429/13 |
| 5,563,802 A | 10/1996 | Plahn et al. ................. | 364/492 |
| 5,569,551 A | 10/1996 | Pedicini et al. ............... | 429/27 |
| 5,578,183 A | 11/1996 | Cooper ......................... | 205/64 |
| 5,635,051 A | 6/1997 | Salas-Morales et al. ..... | 205/602 |
| 5,637,414 A | 6/1997 | Inoue et al. ................... | 429/13 |
| 5,780,186 A | 7/1998 | Casey .......................... | 429/229 |
| 5,783,932 A | 7/1998 | Namba et al. ................ | 322/16 |
| 5,795,666 A | 8/1998 | Johnssen ...................... | 429/17 |
| 5,795,679 A | 8/1998 | Kawakami et al. ........... | 429/218 |
| 5,824,434 A | 10/1998 | Kawakami et al. ........... | 429/209 |
| 5,849,427 A | 12/1998 | Siu et al. ...................... | 429/19 |
| 5,869,200 A | 2/1999 | Nunnally ...................... | 429/10 |
| 5,880,536 A | 3/1999 | Mardirossian ............... | 307/44 |
| 5,885,727 A * | 3/1999 | Kawatsu ...................... | 429/17 |
| 5,929,538 A | 7/1999 | O'Sullivan et al. ........... | 307/66 |
| 5,952,117 A | 9/1999 | Colborn et al. ............... | 429/27 |
| 5,961,928 A | 10/1999 | Maston et al. ............... | 422/110 |
| 5,969,435 A | 10/1999 | Wilhelm ....................... | 307/64 |
| 5,984,986 A | 11/1999 | Wiesheu et al. .............. | 48/203 |
| 5,985,474 A | 11/1999 | Chen et al. .................... | 429/17 |
| 5,999,888 A | 12/1999 | Aubee ........................... | 702/45 |
| 6,051,192 A | 4/2000 | Maston et al. ............... | 422/110 |
| 6,067,482 A | 5/2000 | Shapiro ......................... | 700/286 |
| 6,107,691 A * | 8/2000 | Gore et al. .................... | 290/1 R |
| 6,186,254 B1 * | 2/2001 | Mufford et al. ............. | 180/65.3 |
| 6,230,496 B1 | 5/2001 | Hofmann et al. ............. | 60/706 |
| 6,242,873 B1 | 6/2001 | Drozdz et al. ................ | 318/139 |
| 6,321,145 B1 * | 11/2001 | Rajashekara ................. | 701/22 |
| 6,326,763 B1 * | 12/2001 | King et al. ................... | 320/101 |

* cited by examiner

SYSTEM AND METHOD FOR POWER MANAGEMENT

RELATED PATENT APPLICATIONS AND PATENTS

This application is related to U.S. Pat. Nos. 5,952,117; 6,153,328; 6,296,958; and 6,162,555, all of which are owned in common by the assignee hereof, and all of which are fully incorporated by reference herein as though set forth in full.

FIELD OF THE INVENTION

The present invention relates generally to a system and method for power management in monitoring and controlling a regenerative fuel cell and at least one powered device, and is specifically concerned with a system and method providing for the power management system to communicate with a user and at least one powered device over a communication interface.

BACKGROUND OF THE INVENTION

The business world and our personal lives have become highly dependent on the communications industry. Technological advances have created the ability for individuals to access and control vast amounts of information from anywhere in the world using electronic devices such as computers and computer network systems. These electric consuming devices require a high level of reliable electricity along with minimal power interruptions. For example, in the industry of facilities automation management billions of dollars are spent each year on electricity delivered to homes, commercial facilities, industrial facilities, and on automated systems used for monitoring and controlling all aspects of these facilities. The automated systems can be highly sophisticated processing systems that require a steady, reliable supply of electricity.

The growth of technology has created one of the most important and fastest growing global problems because there is a growing gap between the reliability of the current electricity supply and the level of reliability actually needed by today's electric consuming devices. The reliability of electricity supply in the United States is currently dropping because demand is increasing faster than supply. The growth of the electric supply has been curtailed, in part, because of the uncertainty due to the electric industry deregulation, increased environmental concerns, and opposition to new powerplants due to aesthetic reasons and the perceived health and safety risks.

Alternative methods of supplying reliable electricity are being evaluated such as distributed generation and energy storage. Distributed generation is the generation of electricity using many small generators scattered throughout a service territory. Distributed generation can be used to augment the local electricity supply without having to build additional large central-station powerplants.

Energy storage can significantly improve the electricity supply by storing energy at off-peak times for consumption during peak demand periods. This use of energy storage is often referred to as "load leveling" since it levels the power demand on the electric grid by the load. Load leveling is particularly useful when it is widely distributed and located at or near the point of electricity use, since it reduces the regional requirement for peak generating capacity and reduces the local requirements for transmission and distribution capacity. When energy storage is performed on the customer side of the electric meter, it is often called "peak shaving" rather than load leveling. Many structures and facilities in remote locations or in developing nations use energy storage in the form of non-electric grid renewable energy systems such as a wind energy collector or solar power. These non-electric grid systems require backup generators or another means of energy storage to provide electricity when the wind is not blowing or the sun is not shining.

Many electric consuming devices require premium, highly reliable power well beyond typical 99.9% electric grid power supplied in the United States. The demand for premium power has traditionally been served with backup power systems or uninterruptible power systems (UPSs). All backup power systems and UPSs include some form of energy storage, generation, or combination of both. In current state-of-the-art systems, lead-acid batteries are generally used for energy storage and generators running on gasoline, diesel fuel, propane, or natural gas are used for generation. Lead-acid batteries are generally used because they provide instantaneous energy and can handle most power outages, which are generally under 20 minutes in duration. For power outages that are longer in duration, a generator can be configured to automatically supply electricity when needed.

There are several disadvantages in using lead-acid batteries for energy storage within a system including: (1) a limited energy storage capacity, (2) rapid deterioration when exposed to temperatures over 35° C., (3) rapid deterioration if discharged without frequent recharges, (4) inability to provide continuous power backup since they take many hours to recharge, (5) contain a large amount of lead that is toxic, (6) the energy contained in the batteries cannot be physically extracted for use in other devices, and (8) impractical for daily load leveling or peak shaving due to limited cycle life.

Some of the disadvantages in using lead-acid batteries can be overcome by combining them with a generator, which introduces other disadvantages including (1) noise and emission of poisonous gases, (2) not electrically rechargeable and reliant on fuel that goes bad after prolonged storage, (3) operates using highly flammable fuels that create a hazard to personnel and property, and (4) requires a relatively high level of maintenance.

A fuel cell can overcome most of the problems encountered with using lead-acid batteries, a generator, or a combination of both. A fuel cell provides the ability to generate reliable electricity and to deliver that energy on demand to powered devices. Fuel cells come in many different forms including zinc fuel cells and various types of hydrogen fuel cells such as phosphoric acid, proton exchange membrane (solid polymer), molten carbonate, solid oxide, and alkaline. Fuel cells generally produce electricity by electrochemically reacting a fuel and a reactant resulting in a reaction product. The fuel cells provide a clean and efficient energy source by producing zero emission electricity.

A fuel cell that has the added ability to regenerate or reuse reaction product is even more environmentally friendly. These fuel cells are often called "regenerative fuel cells" since the fuel cell includes hardware that can turn the reaction product back into fuel and reactant. This regenerative ability makes the regenerative fuel cell a perfect system to be used in remote locations, onboard a vehicle, and in facilities where it is inconvenient to periodically refuel the fuel cell.

Though still relatively undeveloped, regenerative fuel cells are now taking the form of hydrogen fuel cells and zinc fuel cells. A hydrogen regenerative fuel cell is configured for hydrogen and oxygen to be fed into the fuel cell. The resulting reaction results in the generation of electricity and a reaction product in the form of water. The water is recirculated back to a storage unit where it can later be regenerated back into hydrogen and oxygen. A zinc fuel cell is configured for zinc and oxygen to be fed into a fuel cell along with an electrolyte. The electrolyte is used as the transport medium for the zinc fuel, which is usually in the form of small particles. The resulting reaction results in the generation of electricity.and a reaction product in the form of zinc oxide. The zinc oxide is recirculated back to a storage unit where it can later be regenerated back into zinc and oxygen.

The lack of significant energy storage capacity in the electric distribution system, combined with shrinking excess generating capacity, has caused and will continue to cause a reduction in the reliability of the electricity supply in the United States and developing nations, which have an even less reliable electric supply.

As the global community becomes more dependent on highly specialized electronic devices, the need for reliable electricity will increase along with the need to manage the supplied electricity. Power management in monitoring and controlling the electricity to these powered devices is essential in assuring that with increasing power loads the powered devices will have reliable power along with power backup when needed. Communication between the electric grid, the fuel cell, and powered devices is necessary to monitor and control operating conditions for reliable power.

As air pollution and rising fuel costs become increasingly important for operators of long-haul trucks and other vehicles, it is becoming more important for the operators of these vehicles to adopt new zero-emission technologies for powering auxiliary devices. For example, it is estimated by the US Department of Energy that the average long-haul heavy-duty truck spends up to $4,500 per year in fuel, repairs, and shortened engine life due to idling the truck's main engine to power auxiliary devices such as the television and air conditioner when the truck is parked. An on-board power management system incorporating a regenerative fuel cell could solve this problem.

For the reasons described above, there remains a need for a power management system that provides for monitoring and controlling a regenerative fuel cell and at least one powered device using energy storage for backup power, UPS, or load leveling/peak shaving applications, is electrically rechargeable or rapidly refuelable, and incorporates a method for communicating over an interface with a user, a regenerative fuel cell, and at least one powered device for sending and receiving data.

SUMMARY OF THE INVENTION

It is an object of the present invention to provide a power management system for supplying reliable electricity to be used for backup power, load leveling/peak shaving, supplying a regional electric grid, or powering electric consuming devices in a manner that is environmentally safe.

It is a further object of the present invention to provide a power management system with a regenerative fuel cell that is electrically rechargeable or rapidly refuelable by having a refillable fuel system utilizing refillable transportable containers.

It is still another object of the present invention to provide a power management system that monitors and controls a regenerative fuel cell and at least one powered device.

It is an object of the present invention to provide a power management system that provides for communication between a user, a regenerative fuel cell, and at least one powered device over a communication interface.

It is a further object of the present invention to provide a power management system that provides generated electricity to powered devices located onboard a vehicle and where the electricity is used to propel the vehicle or to power auxiliary devices onboard the vehicle.

It is still another object of the present invention to provide a power management system that is compact, efficient, and easy to use.

Additional objects include any of the foregoing objects, singly or in combination.

According to one aspect of the present invention, the power management system comprises a regenerative fuel cell and a communication interface configured to allow communication of data between the regenerative fuel cell and an external device, wherein the regenerative fuel cell is configured to deliver and receive power responsive to one or more parameters received from the external device over the interface.

The regenerative fuel cell comprises a fuel storage for storing fuel, a fuel cell for electrochemically reacting the fuel with a second reactant to release electricity, a reaction product storage for storing reaction product resulting from the reaction, a fuel regenerator for electrochemically recovering the fuel from the reaction product, and an optional second reactant storage unit. In some cases, the fuel cell itself may be used to regenerate the fuel. A communication device may be provided for monitoring and controlling the regenerative fuel cell, at least one powered device, and at least one energy source.

The power management system may further include a power interface, wherein electricity can be sent and received over the power interface; at least one energy source in communication with the communication device, the at least one energy source providing electricity to the regenerative fuel cell and at least one powered device, wherein the regenerative fuel cell can send electricity to and receive electricity from the at least one energy source. The system may further include a user interface for exchanging data between a user and the regenerative fuel cell or device.

In another aspect of the present invention, a method for remotely controlling a regenerative fuel cell comprises the steps of inputting data over a user interface; providing the data to the regenerative fuel cell over a communication interface; and configuring the regenerative fuel cell to deliver power responsive to the data. The data comprises control parameters for the regenerative fuel cell.

In another aspect of the present invention, a method for monitoring at least one powered device comprises the steps of gathering data from at least one powered device; transmitting the data from at least one powered device to a regenerative fuel cell over a communication interface; and receiving and storing the data on a communication device in communication with the regenerative fuel cell. The data can be transmitted to a user. The data can be selected from the group comprising power usage information, environmental information, operating parameters, and control parameters.

The method for monitoring at least one powered device may further comprise the steps of comparing the data against preset control parameters supplied by a user; delivering power to the powered device responsive to the data; receiving the updated control parameters by at least one powered device; sending the updated control parameters from the powered device to other powered devices; and adjusting operation to perform within the updated control parameters.

In another aspect of the present invention, a method of power management for monitoring and controlling a regenerative fuel cell and at least one powered device through the use of a communication device comprises the steps of receiving power delivery requests; activating the regenerative fuel cell by commands from the communication device; electrochemically reacting a fuel and a second reactant; generating electricity and a reaction product from the reaction; and delivering the generated electricity.

BRIEF DESCRIPTION OF THE FIGURES

Understanding of the present invention will be facilitated by consideration of the following detailed description of exemplary embodiments of the present invention taken in conjunction with the accompanying drawings, in which like numerals refer to like part and in which.

DETAILED DESCRIPTION OF THE INVENTION

Figure 1:
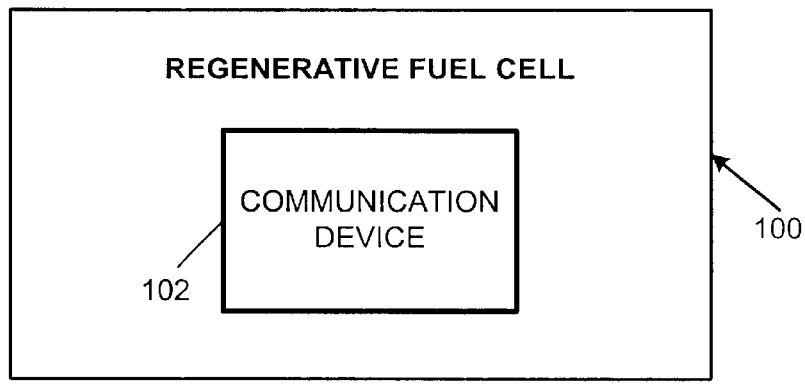
FIG. 1 is a block diagram of one embodiment of the present invention comprising a regenerative fuel cell and a communication device.

A first embodiment of a power management system in accordance with the subject invention is illustrated in FIG. 1. The power management system of FIG. 1 comprises a regenerative fuel cell 100 and a communication device 102.

Figure 7:
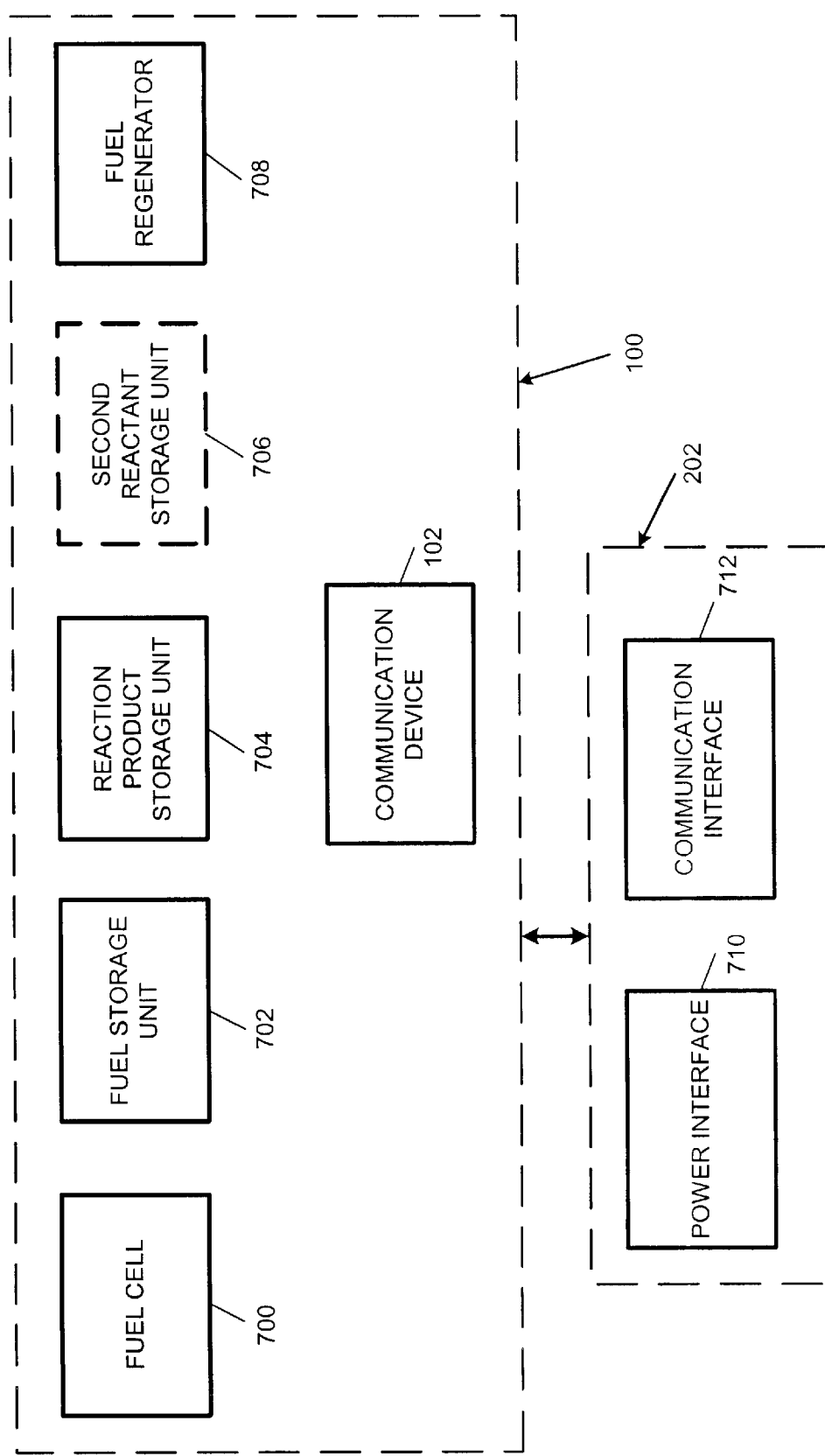
FIG. 7 is a block diagram of an example implementation of the regenerative fuel cell along with a communication device and an interface.

In one implementation as illustrated in FIG. 7, the regenerative fuel cell 100 comprises a fuel storage unit 702 for storing fuel, a fuel cell 700 for electrochemically reacting the fuel with a second reactant to release electricity, a reaction product storage unit 704 for storing reaction product resulting from the reaction, and a fuel regenerator 708 for electrochemically recovering the fuel from the reaction product. The fuel storage unit 702 can store a fuel that can be any material that releases electrical energy when reversibly combined electrochemically with a second reactant. For example, the fuel can be, but is not limited to, hydrogen or zinc.

A second reactant product storage unit 706 can optionally be included for storing the second reactant. The second reactant can be any substance that will react with the fuel for producing electricity. For example, the second reactant will generally be an oxidant such as, but not limited to, oxygen (either in pure form or in air from the atmosphere), peroxides, or halogens. The choice of a second reactant will depend on the choice of fuel used for a selected reaction. The regenerative fuel cell 100 may provide for at least one of the fuel storage unit 702, the fuel cell 700, or the reaction product storage unit 704 to simultaneously store an electrolyte. The electrolyte can be used in combination with the fuel and second reactant in the fuel cell 700 for contributing to the reaction for producing electricity. In some cases the electrolyte may also be used as a transport medium for moving fuel and reaction product in and out of the fuel cell and fuel regenerator.

The fuel regenerator 708 is used for the regeneration process of electrochemically reducing the fuel from its oxidized state and releasing the second reactant. The fuel regenerator 708 can be configured to use various methods for the regeneration process. The fuel regenerator 708 can be physically incorporated into the regenerative fuel cell 100 or can be physically separate from the regenerative fuel cell 100. Alternatively, the fuel regenerator 708 is the fuel cell 700.

Figure 13:
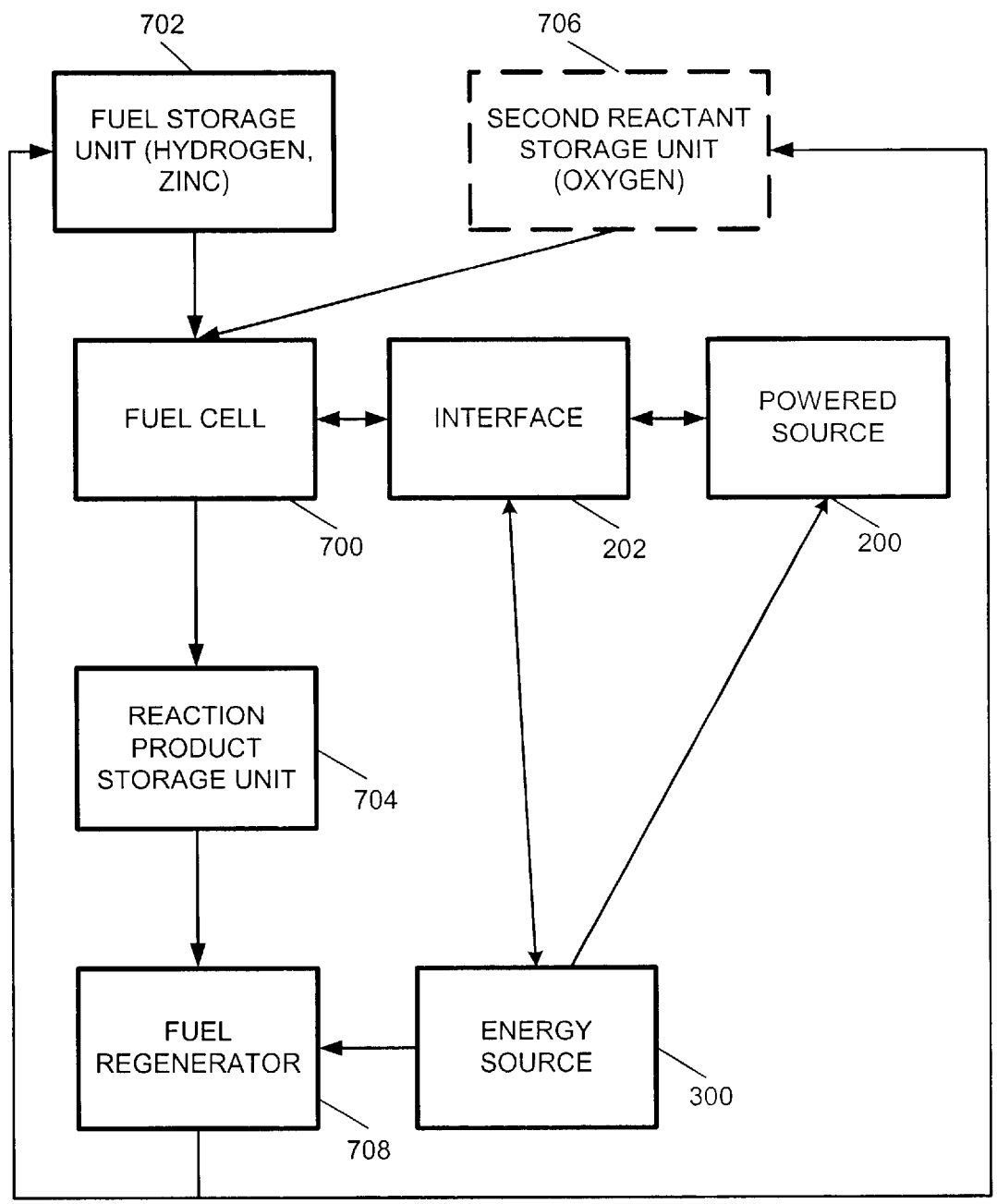
FIG. 13 is a block diagram illustrating the operation processes of the power management system.

In one implementation as illustrated in FIGS. 7 and 13, the fuel regenerator 708 is supplied electricity from at least one energy source 300 for the regeneration process. The reaction product is moved from the reaction product storage unit 704 into the fuel regenerator 708. The electrochemical reaction that takes place within the fuel regenerator involves reducing the fuel from its oxidized state and releasing the second reactant. Once this reverse reaction has occurred, the fuel is moved into the fuel storage unit 702 and the second reactant is moved into the second reactant storage unit 706 or released to the environment.

In one implementation, the regenerative fuel cell 100 will include a system for inserting and removing quantities of fuel, reaction product, and second reactant. This system will provide the regenerative fuel cell 100 with ability to be rapidly refueled in a quick and efficient manner. For example, refueling can take place by removing reaction product and adding fuel. This can be accomplished using refillable transportable containers, hoses, or any other acceptable means. The fuel can be compressed hydrogen gas, liquid hydrogen, hydrogen stored in a metal hydride, zinc particles immersed in potassium hydroxide electrolyte, or any other acceptable fuel. Alternatively, the refueling procedure can also be used in reverse where fuel can be removed and stored for emergency use or to power other devices. The fuel is removed and replaced with an equivalent quantity of reaction product. The reaction product will be used for regeneration back into fuel and a second reactant.

In one implementation example, zinc is used as the fuel and oxygen as the second reactant. In this implementation example, the regenerative fuel cell 100 could include a second reactant storage for storing the oxygen. Alternatively, the oxygen can be obtained from the ambient air. The regenerative fuel cell 100 may have a small power source to provide initial startup power to a pump and a blower to move the fuel, the second reactant, and the electrolyte into the fuel cell 700. The power source can be a battery or other electricity source. Within the fuel cell 700 a reaction occurs resulting in the generation of electricity. The zinc is consumed and releases electrons to drive a load (the anodic part of the electrochemical process), and the oxygen accepts electrons from the load (the cathodic part). The reaction between the zinc and oxygen, mediated by the electrolyte, yields a reaction product of zinc oxide. The zinc oxide gets mixed or dissolved into the electrolyte and is then pumped into the reaction product storage unit 704 until regeneration is needed.

In another implementation example, hydrogen is used as the fuel and oxygen or air as the second reactant. In this implementation example, the regenerative fuel cell 100 can include a second reactant storage unit 706 for storing the oxygen. The regenerative fuel cell 100 has a small power source to provide initial startup power to a pump and a blower to move the fuel, the second reactant, and the electrolyte into the fuel cell 700. The power source can be a battery or other electric source.

Within the fuel cell 700 a reaction occurs resulting in the generation of electricity. The reaction between the hydrogen and oxygen, mediated by the electrolyte (which may be liquid or solid) yields a reaction product of water. The water is then pumped into the reaction product storage unit 704 until regeneration is needed. The regeneration process is initiated by circulating the water into the fuel regenerator 708 from the reaction product storage unit 704. The reaction product (water) is then electrochemically converted back into hydrogen and oxygen.

More detailed information on the regenerative fuel cell can be found in U.S. Pat. No. 5,952,117, U.S. patent application Ser. No. 09/449,176, now U.S. Pat. No. 6,153,328; U.S. patent application Ser. No. 09/521,392, now U.S. Pat. No. 6,296,958; and U.S. patent application Ser. No. 09/353,422, now U.S. Pat. No. 6,162,555, each of which is fully hereby fully incorporated by reference herein as though set forth in full.

Figure 2:
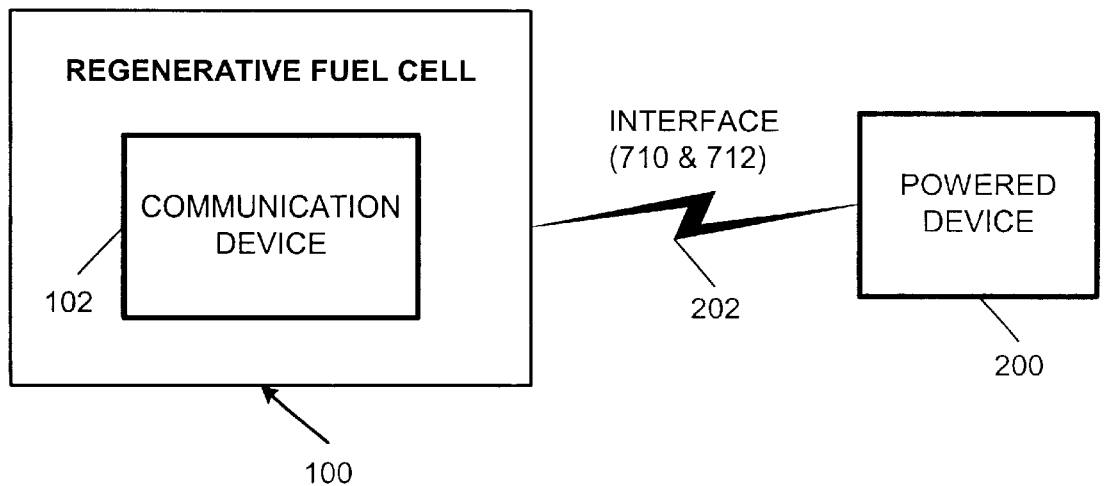
FIG. 2 is a block diagram of an implementation of one embodiment of the present invention comprising a regenerative fuel cell, a communication device, an interface, and at least one powered device.
Figure 11:
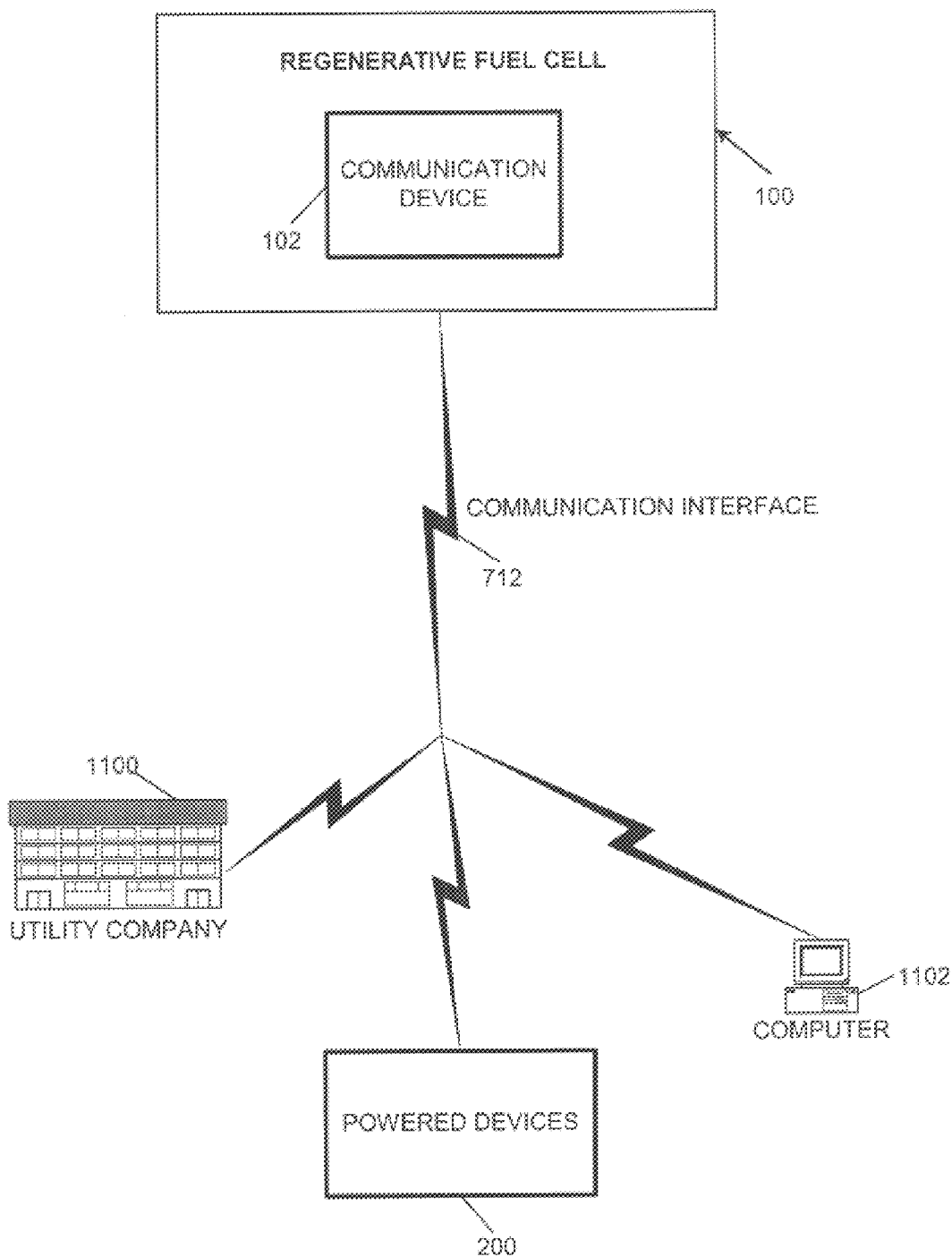
FIG. 11 is a system block diagram showing the communication device and regenerative fuel cell having the ability to send data to and receive data from a plurality of example devices over the communication interface.

The communication device 102 has the capability of monitoring and controlling all components of the power management system including the regenerative fuel cell 100, at least one powered device 200, and at least one energy source 300. The communication device 102 can be any device that allows for data to be sent and received over a communication interface 712 as illustrated in FIGS. 2, 7, and 11. The communication device 102 can be incorporated into the physical structure of the regenerative fuel cell 100. Alternatively, the communication device 102 can be housed in a separate structure independent of the regenerative fuel cell 100, but is directly connected to the regenerative fuel cell 100.

The communication device 102 is at least one selected from the group comprising of a processor coupled to memory, a computer, laptop, handheld computer, PDA (Personal Digital Assistant), mainframe, server system, mobile phone, or any other device that contains a processor and memory.

In one implementation, the communication device 102 is incorporated into the physical structure of the regenerative fuel cell 100 and is a processor coupled to memory. This implementation can provide for a display and an input device to be connected externally to the regenerative fuel cell 100 allowing the display and input device to communicate with the processor and memory for monitoring and controlling. The display can be any device that,allows for data to be displayed to a user. For example, an LCD display, monitor, TV, or other similar device. The input device can be any device that allows for entry or selection of data such as a mouse, pointing device, input device, keypad, keyboard, light pen, remote control, shortcut buttons, or any other related entry device.

In another implementation, the communication device 102 is incorporated into the physical structure of the regenerative fuel cell 100 and comprises a processor coupled to memory, a display, and an input device. The display and input device can be the same as discussed above except that they would be internal rather than external to the regenerative fuel cell 100.

In another implementation, the communication device 102 is not physically incorporated into the structure of the regenerative fuel cell 100, but is directly connected to the regenerative fuel cell 100 to provide monitoring and controlling. For example, the direct connection can be cable, wire, electrical wiring connection, or any other related connection mechanism. The communication device in this implementation can be a computer.

Figure 6:
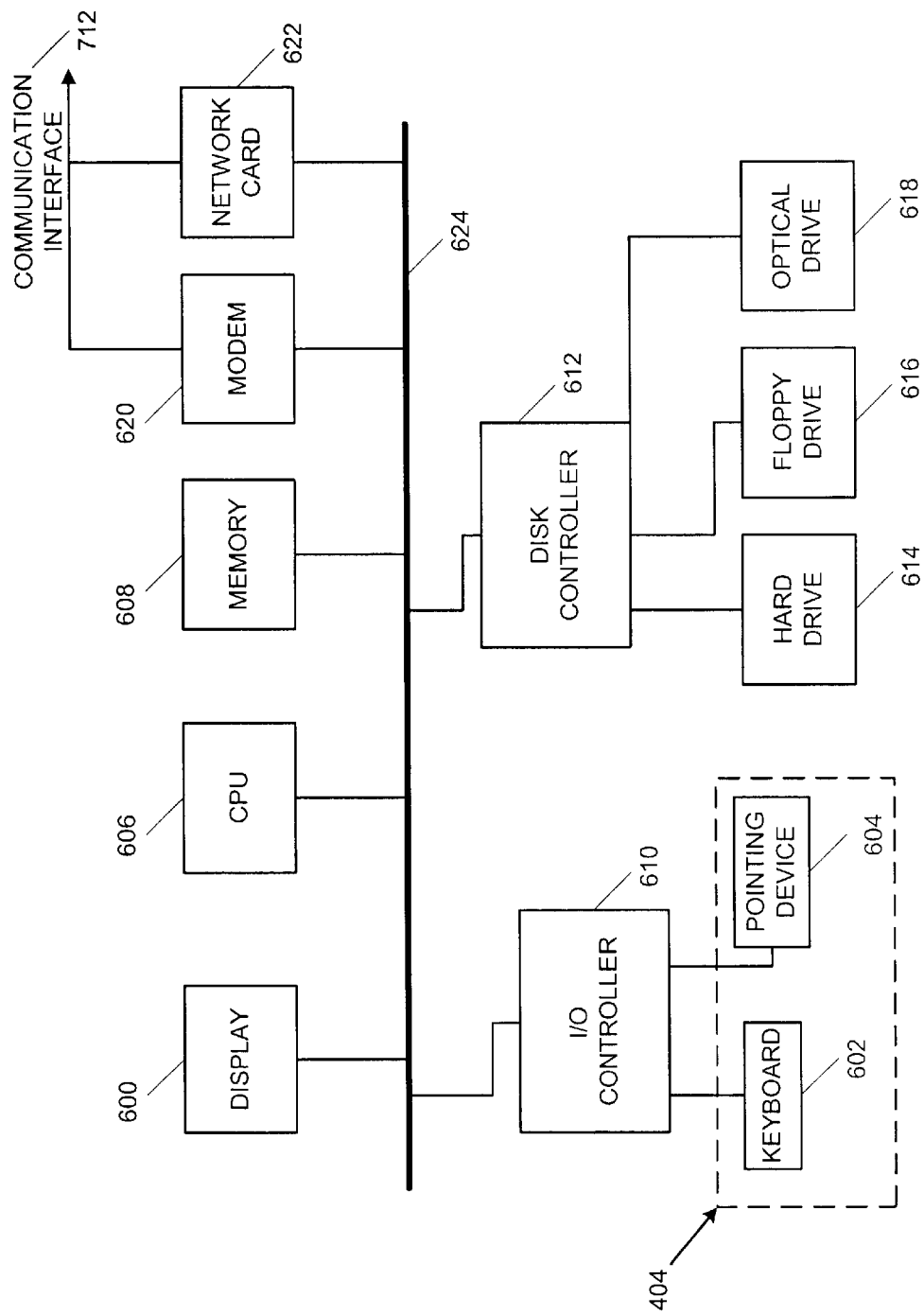
FIG. 6 is a block diagram of an example implementation of the communication device configured as a computer.

In an exemplary implementation of a communication device, the communication device 102 is configured as a computer as illustrated in FIGS. 1 and 6. The communication device 102 can be a computer with the hardware architecture including a display 600, input device 404 (keyboard 602, pointing device 604), CPU (Central Processing Unit) 606, memory 608, I/O controller 610, disk controller 612, hard drive 614, floppy drive 616, optical drive 618, modem 620, and network card 622. Each of the devices intercommunicate over bus 624 either directly or over their respective interfaces or controllers. The computer is not limited to these generally common devices as the computer can and does include any other computer related devices.

The communication device 102 can include a software system in any of the above implementations. The software system can include any of the following an operating system (OS), communication software, graphical user interface (GUI), and software applications. The operating system manages all the programs in the communication device 102 referred to as software applications.

The operating system can be any standard operating system for use on a communication device. For example, the operating system can be Microsoft Windows™, Microsoft Windows 95™, Microsoft Windows 98™, Microsoft Windows 2000™, Microsoft Windows NT™, Microsoft Windows CE™, any Microsoft Windows based operating system, the Palm™ OS, Mac OS™, IBM OS/2™, Unix, Linux, PLC based, proprietary based, or any other similar based operating system. The operating system will preferably allow a communication device 102 to communicate with external devices and run related applications. The communication software allows the communication device 102 to send data to and receive data from external devices over the communication interface 712.

The graphical user interface (GUI) can be any program that allows information to be displayed to a user. For example, a proprietary software program or an Internet web browser (web browser) can be used. The Internet web browser can be any software that will communicate with an Internet server over the communication interface 102 such as Netscape Navigator™, Netscape Communicator™, Microsoft Internet Explorer™, HotJava™, Mosaic™, Opera™, or similar related web browser software.

The communication device 102 is connected to the regenerative fuel cell 100 so that the communication device 102 can be the master control to operate each component independently or dependently. The communication device 102 can be connected to associated sensors, relays, electronic components, or electrical devices of the regenerative fuel cell 100 for monitoring and controlling all aspects of operation. In addition, the communication device 102 can provide for tracking operational and statistical information regarding the regenerative fuel cell 100. For example, the communication device 102 can store information including power usage, fuel consumption, fuel storage unit 702 information, second reactant storage unit 706 information, reaction product storage unit 704 information, fuel regenerator 708 information, and fuel regeneration information.

Figure 4:
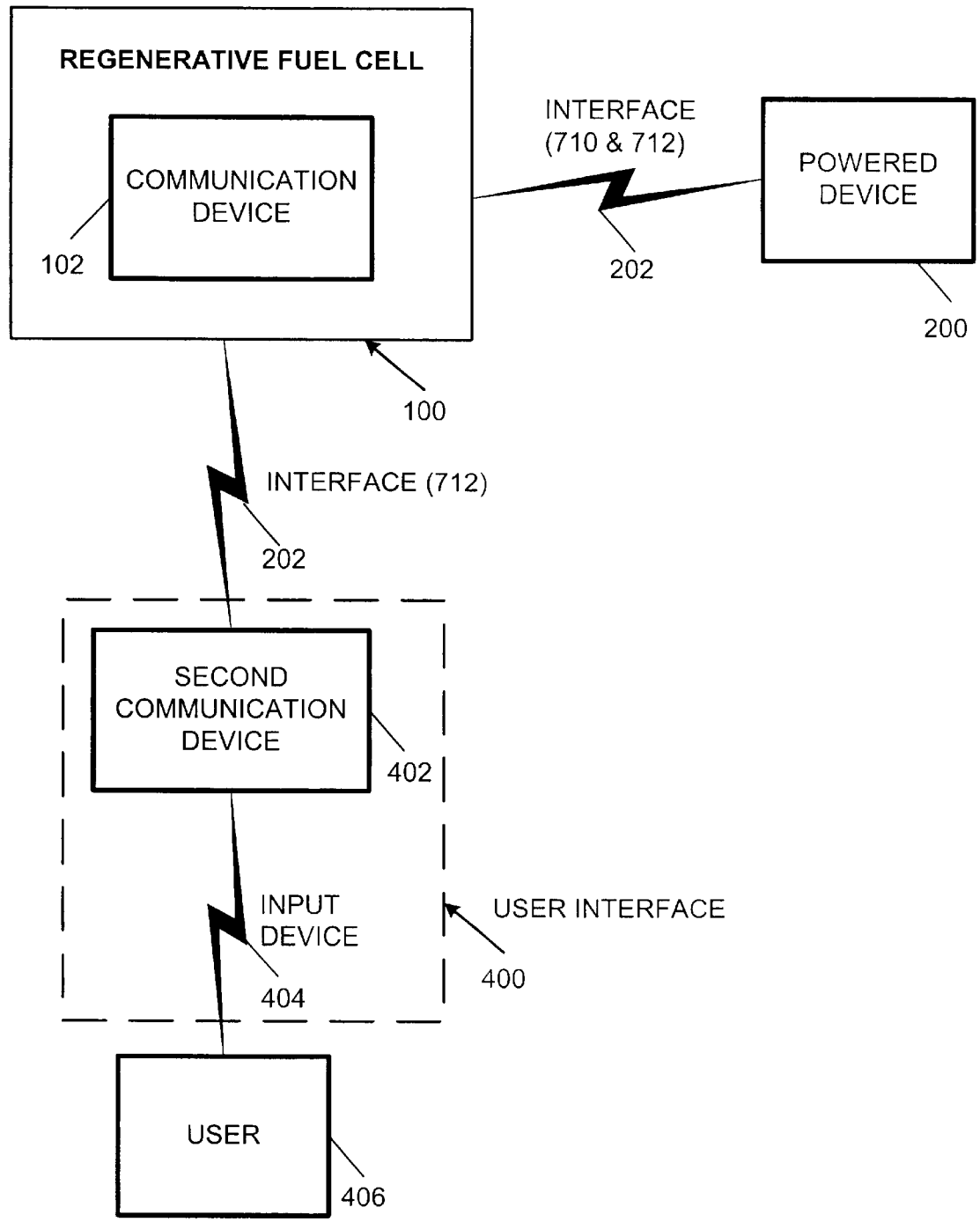
FIG. 4 is a block diagram of an implementation of one embodiment of the present invention comprising a regenerative fuel cell, a communication device, an interface, at least one powered device, and a user interface.

The communication device 102 can provide for updating and storing information regarding the operation and performance of the regenerative fuel cell 100 to other communication devices, which will be discussed further below. The communication device 102 can operate independently of the regenerative fuel cell 100 in communicating with powered devices and other communication devices as shown in FIGS. 2 and 4, which will be discussed further below. The implementations of the present invention is not dependent on any particular device and can be implemented in various configurations and architectures.

A second embodiment of the power management system in accordance with the subject invention is illustrated in FIG. 2 in which, compared to FIG. 1, like elements are referenced with like identifying numerals. The power management system of FIG. 2, includes, as before, a regenerative fuel cell 100, a communication device 102, and further includes an interface 202 and at least one powered device 200.

The interface 202 is connected to the regenerative fuel cell 100. The interface 202 comprises at least one of a power interface 710 or a communication interface 712 as illustrated in FIG. 7. The power interface 710 and the communication interface 712 can be the same interface or each can be a different interface.

Figure 3:
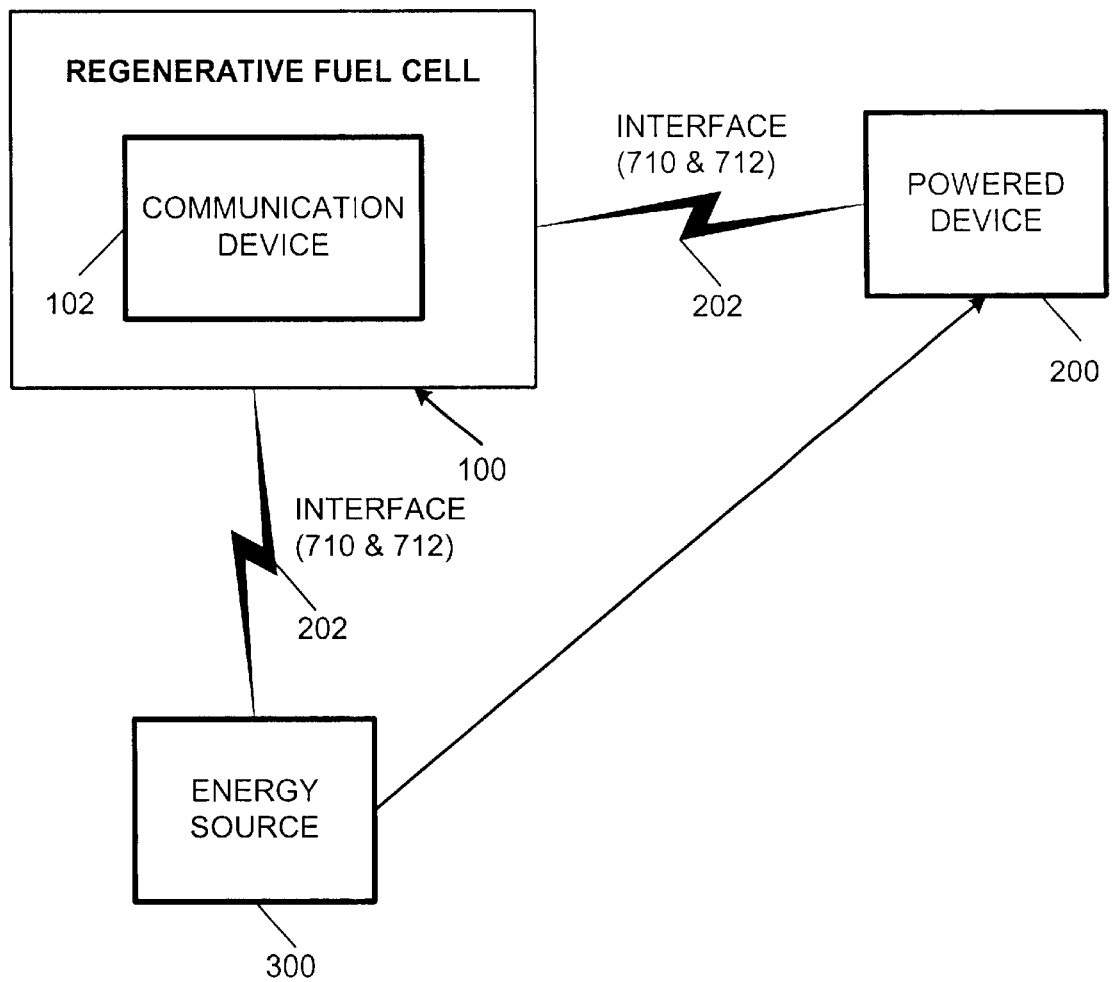
FIG. 3 is a block diagram of an implementation of one embodiment of the present invention comprising a regenerative fuel cell, a communication device, an interface, at least one powered device, and at least one energy source.

The power interface 710 allows for the power management system to be easily interconnected with the existing electrical power wiring of a facility, structure, building, or vehicle to perform power management. For example, the existing electrical power wiring can become part of the power interface 710. The power interface 710 is configured to deliver electricity generated by the regenerative fuel cell 100. The power interface 710 can also receive electricity from at least one energy source as shown in FIG. 3, which will be discussed further below.

The power interface 710 provides for any conversion or conditioning that needs to take place in supplying or receiving electricity. In one implementation, the power interface 710 can convert the DC generated by the regenerative fuel cell 100 and convert it to AC for supplying to at least one powered device 200. In another implementation, the power interface 710 can receive AC and convert it to DC for use by the regenerative fuel cell 100, the power interface 710 can also supply and receive DC without the need for conversion. Generally, it is preferable for any power conversion and conditioning hardware portion of the power interface 710 to be located, on, or within the regenerative fuel cell.

The communication interface 712 can be any interface that allows the sending and receiving of data. In one implementation, the communication interface 712 is a wireless based system such as cellular based, digital cellular, GSM (Global System for Mobile communication), PCS (Personal Communications Services), PDC (Personal Digital Cellular), radio communications, or satellite communications system. The wireless based systems as discussed above can utilize either a Wireless Application Protocol (WAP) or Bluetooth Wireless Technology Standard for sending and receiving data over the communication interface 712. WAP is a specification for a set of communication protocols to standardize the way that wireless communication devices can be used for Internet access, including email, the World Wide Web (WWW), Usenet, and Internet Relay Chat (IRC). The Bluetooth Wireless Technology Standard is a computing and telecommunications industry specification that describes how mobile phones, computers, and PDAs (personal digital assistants) can easily interconnect with each other and with home and business phones and computers using a short-range wireless connection.

In one implementation, the communication interface 712 is a land-line based system such as a local area network (LAN), wide area network (WAN), ISDN (Integrated Services Digital Network), DSL (Digital Subscriber Line), xDSL (ADSL, HDSL, RADSL), Internet Cable, cable modem, PPP (Point-to-Point Protocol) connections, fiber-optic cabling, or electrical wiring. The electrical wiring, for example, can be the existing power wiring in a building, structure, facility, or vehicle.

Internet access or Internet communication is considered to be inherent in any implementation of the communication interface 712. Selection and incorporation of such a communication interface will be apparent to those of skill in the art.

In another implementation, the communication interface 712 is the Internet. The Internet is a global network of computers referred to as servers which are accessible by communication devices, often referred to as "user nodes" or "client computers." These communication devices typically access the Internet through Internet Service Providers (ISPs), On-line Service Providers (OSPs), or direct Internet connections. Each computer on the Internet, referred to as a host, has at least one address that uniquely identifies it from all other computers on the Internet often referred to as an IP (Internet Protocol) address.

Figure 12:
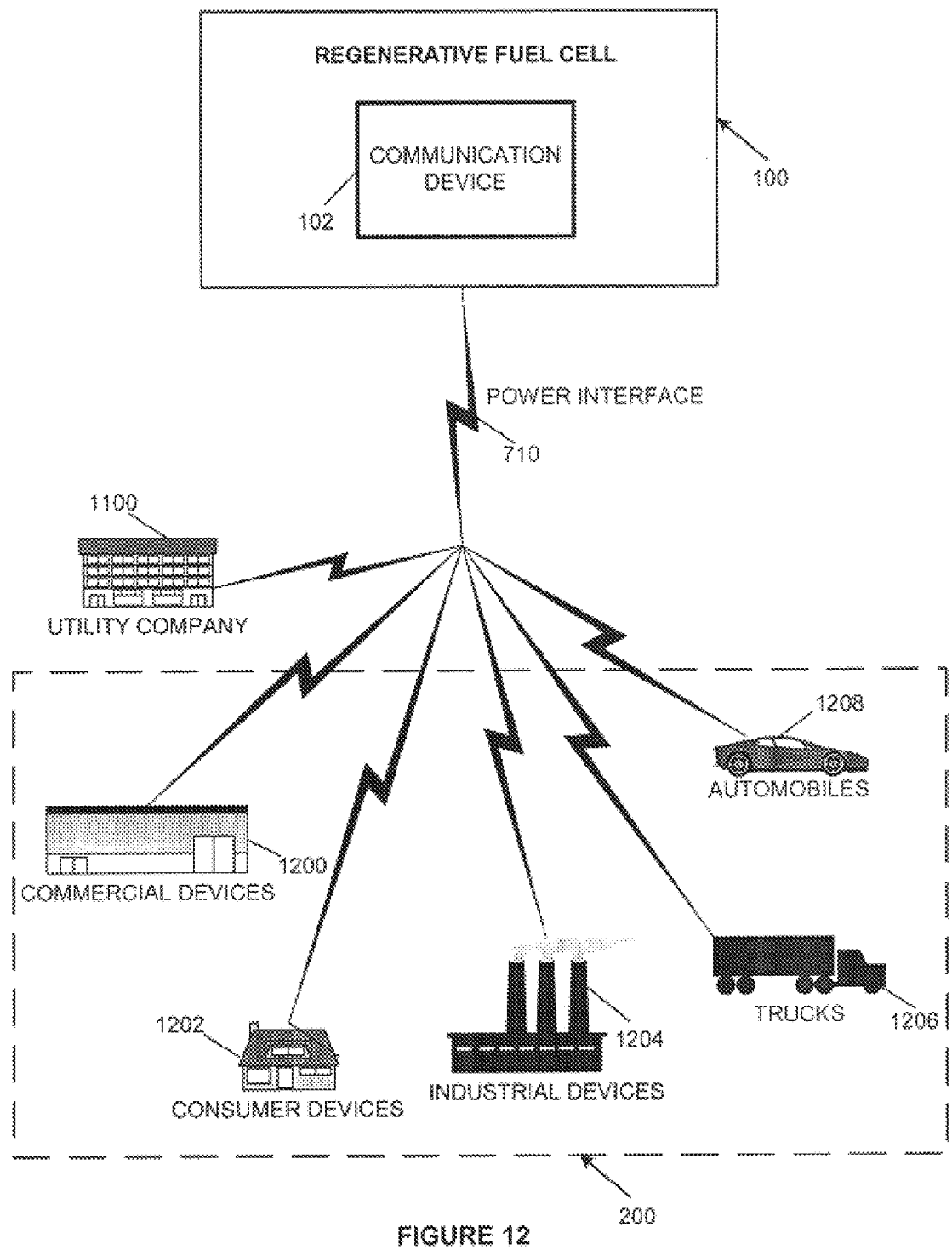
FIG. 12 is a system block diagram showing the communication device and regenerative fuel cell having the ability to send power to a plurality of example devices over the power interface along with the ability to receive power from a plurality of example devices over the power interface.

The at least one powered device 200 can be any device that is electric consuming as illustrated in FIGS. 2 and 12. The at least one powered device 200 comprises at least one selected from the group of an energy usage system, security system, environmental system, commercial devices 1200, consumer devices 1202, industrial devices 1204, manufacturing devices, vehicles, automobiles 1208, trucks 1206, trailer, recreational vehicle, motorcycle, smart appliances, household appliances, engines, computers, telecommunication equipment, cellular base stations, distributed terminals, sensors, electrical devices located onboard a vehicle, or any electric powered device.

The at least one powered device 200 can also include a communication capability for sending data to and receiving data from the communication device 102 over the communication interface. The at least one powered device 200 can provide for monitoring and controlling other powered devices.

In one implementation, the communication device 102 can monitor and control the regenerative fuel cell 100 to send and receive electricity along with allowing communication of data between the regenerative fuel cell 100 and an external device over a communication interface 712. The external device can be an at least one powered device or at least one other communication device.

The communication device 102 can perform energy management within a building or structure. For example, the communication device 102 can monitor for energy usage of powered devices 200, a regenerative fuel cell 100, or electricity used within a building including all independent loads. The fuel contained within the regenerative fuel cell 100 is regenerated using at least one energy source 300. The implementations of the present invention is not dependent on any particular device and can be implemented in various configurations and architectures.

A third embodiment of the power management system in accordance with the subject invention is illustrated in FIG. 3 in which, compared to FIG. 2, like elements are referenced with like identifying numerals. The power management system of FIG. 3, includes, as before, a regenerative fuel cell 100, a communication device 102, an interface 202, at least one powered device 200, and further includes at least one energy source 300.

The at least one energy source 300 can be any source used for supplying electricity to the regenerative fuel cell 100, communication device 102, and at least one powered device 200 at any time before, during, or after operations. Alternatively, the at least one energy source can receive power generated from the regenerative fuel cell 100 in the form of AC or DC. The at least one energy source 300 can deliver power as AC (alternating current) or DC (direct current) depending on the type of source.

In one implementation, the at least one energy source 300 can be selected from the following group a reciprocating engine, combustion engine, regional electric grid, rotating engine, solar energy collector, battery, generator, turbine, water wheel, flywheel, capacitor, wind energy collector, or any similar related device or combination as discussed above.

In one implementation example, the at least one energy source 300 supplies power to all components of the regenerative fuel cell 100 including the fuel cell 700, fuel regenerator 708, fuel storage unit 702, reaction product storage unit 704, any electric consuming devices on the fuel cell, pumps, blowers, and the optional second reactant storage unit 706. The at least one energy source 300 supplies power as either AC or DC through the power interface 710 to the regenerative fuel cell 100. The power interface 710 will make any necessary power conversions for supplying DC to the perspective components such as AC into DC.

In another implementation example, the at least one energy source 300 supplies power to the communication device 102. The at least one energy source 300 can be configured to directly supply power to the communication device 102. Alternatively, the at least one energy source 300 can supply power indirectly to the communication device 102 through delivering the power to the regenerative fuel cell 100. In either case, the at least one energy source 300 will deliver the power through the power interface and the proper power conversion will take place.

In another implementation example, the at least one energy source 300 can be configured to supply primary power to at least one powered device 200 at any time. The at least one energy source 300 can supply power to the at least one powered device 200 through a direct connection. The direct connection can be any power interface that allows for the sending of electricity. Alternatively, the at least one energy source 300 can supply power to the at least one powered device 200 over the power interface 710. In this configuration, the at least one energy source 300 can supply power over the power interface independent of the regenerative fuel cell 100 or under the control of the communication device 102. The power interface 710 can also reduce harmonic distortion of power delivered to the at least one powered device 200 (power conditioning). The at least one energy source 300 can be configured to power to the at least one powered device 200 during the period immediately following loss of power and until the regenerative fuel cell 100 can provide power. The at least one energy source 300 can be configured to provide extra power for at least one powered device 200 when the regenerative fuel cell 100 is simultaneously powering at least one powered device 200.

In another implementation example, the at least one energy source 300 can receive power from the regenerative fuel cell 100. The regenerative fuel cell 100 can send generated electricity over the power interface 710 directly to the regional electric grid. This allows a business using the power management system to sell back electricity to the Utility company resulting in cost savings for both. In this implementation, the power interface 710 can match the phase and power factor of the generated electricity to those required for selling electricity to the Utility company. In addition, the power interface 710 can condition the generated electricity to meet the requirements needed for sending electricity to the regional grid.

A fourth embodiment of the power management system in accordance with the subject invention is illustrated in FIG. 4 in which, compared to FIG. 2, like elements are referenced with like identifying numerals. The power management system of FIG. 4, includes, as before, a regenerative fuel cell 100, a communication device 102, an interface 202, at least one powered device 200, and further includes a user interface 400.

The user interface 400 comprises a second communication device 402 and an input device 404. The second communication device 402 can be any communication device that allows for data to be sent and received over the communication interface 712. In an implementation, the second communication device 402 can be at least one selected from the group comprising a computer, networked computers, server system, mainframe, laptop, handheld computer, PDA (personal digital assistant), mobile phone, facsimile machine, telephone, video phone, pager, or any other device containing a processor and memory.

The second communication device 402 is in communication with the input device 404 for inputting data by a user 406. The input device 404 can be any device or combination of device that allows for a user 406 to input data to the second communication device 402. The input device 404 is at least one selected from the group comprising manual entry system, voice communication system, thought process system, or any other related system. In one implementation, the input device 404 is a manual manipulation system that can be accomplished by the user 406 using a touch screen, keyboard, keypad, pointing device, mouse, light pen, remote control, or shortcut buttons. In another implementation, the input device 404 is a voice communication system that includes a voice recognition system incorporated into the second communication device, whereby the user speaks into a microphone and the second communication device translates the voice data so that the second communication device will automatically select the user's selection or the input of data. In another implementation, the input device 404 is a thought process system incorporated into the second communication device to allow hands free entry. Neural attachments could be secured to the user's head so that brain waves or brain electrical signals could be translated by the second communication device providing for the second communication device to automatically select the user's selection or input of data. Selection and incorporation of such a second communication device and user interface will be apparent to those of skill in the art.

FIG. 6 is a detailed block diagram of an exemplary implementation of a second communication device 402. The second communication device 402 is a computer with the hardware architecture including display 600, input device 404 (keyboard 602, pointing device 604), CPU (Central Processing Unit) 606, memory 608, I/O controller 610, disk controller 612, hard drive 614, floppy drive 616, optical drive 618, modem 620, and network card 622. Each of the devices intercommunicate over bus 624 either directly or over their respective interfaces or controllers. The computer is not limited to these generally common devices as the computer can and does include any other computer related devices.

The second communication device 402 can include a software system in any of the above implementations. The software system can comprise of any of the following an operating system (OS), communication software, graphical user interface (GUI), and software applications. The operating system manages all the programs in the second communication device 402 referred to as software applications. The operating system can be any standard operating system for use on the second communication device 402. For example, the operating system can be Microsoft Windows™, Microsoft Windows 95™, Microsoft Windows 98™, Microsoft Windows 2000™, Microsoft Windows NT™, Microsoft Windows CE™, any Microsoft Windows based operating system, the Palm™ OS, Mac OS™, IBM OS/2™, Unix, Linux, PLC based, proprietary based, or any other similar based operating system.

The operating system will allow the second communication device 402 to communicate with a communication device 102 and run related applications. The communication software allows the second communication device 402 to send and receive information to external devices over the communication interface 712. The graphical user interface (GUI) can be any program that allows information to be displayed on the second communication device 402. For example, a proprietary software program or an Internet web browser (web browser) can be used. The Internet web browser can be any software that will communicate with an Internet server over the communication interface such as Netscape Navigator™, Netscape Communicator™, Microsoft Internet Explorer™, HotJava™, Mosaic™, Opera™, or similar related web browser software.

A web browser is an application program that provides a mechanism to view and interact with information on the WWW, which is generally in the form of web pages. A web browser is a type of "HTTP client", which allows a user to send HTTP (Hypertext Transfer Protocol) requests to an HTTP server (web server) and receive back an HTTP response that is viewable on the web browser in the form of a web page or other similar related format.

In an implementation example as illustrated in FIGS. 4, 6, and 11, the second communication device 402 is configured as a computer providing for connection with the communication interface 712 which could, for example, be the Internet. The computer can connect to the Internet by a modem 620, network card 622, or any other communication interface that will allow interface between the computer and the Internet. The network card 622 allows the computer to be connected to a LAN (local area network) and/or WAN (wide area network) which communicate with a HUB and router in making a connection to the Internet. The implementations of the present invention is not dependent on any particular device and can be implemented in various configurations and architectures.

Figure 5:
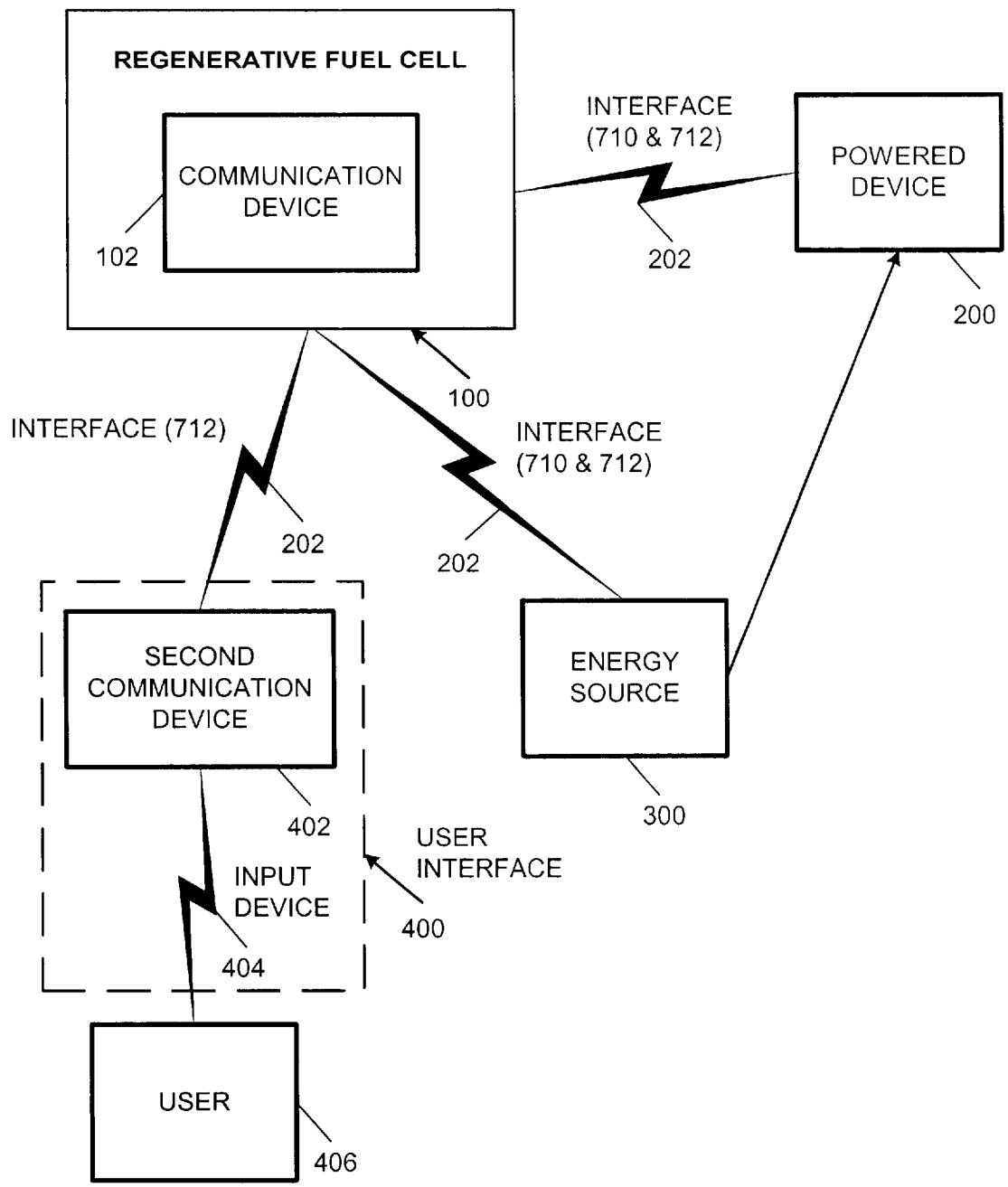
FIG. 5 is a block diagram of an implementation of one embodiment of the present invention comprising a regenerative fuel cell, a communication device, an interface, at least one powered device, at least one energy source, and a user interface.

A fifth embodiment of the power management system in accordance with the subject invention is illustrated in FIG. 5 in which, compared to FIGS. 1–4, like elements are referenced with like identifying numerals. The power management system of FIG. 5, includes a regenerative fuel cell 100, a communication device 102, an interface 202, at least one powered device 200, at least one energy source 300, and a user interface 400. This embodiment incorporates and includes all implementations as discussed above in the previous embodiments.

In this embodiment, the entire power management system provides for monitoring and controlling of the regenerative fuel cell 100 and at least one powered device 200. The power management system may also monitor and control at least one energy source 300. The monitoring and controlling includes communicating with the regenerative fuel cell 100, at least one powered device 200, at least one energy source 300, and a user interface 400. Further, the system can deliver power either from the regenerative fuel cell 100 or from the at least one energy source 300 responsive to data received by the communication device 102 from the at least one powered device 200 or from the user interface 400. The at least one energy source 300 provides power to the power management system and all components when needed and available. A user 406 can utilize the input device 404 for inputting data to the second communication device 402 and then transfer that data or request to the communication device 102 over the communication interface 712. The communication device 102 can process that data and communicate with external devices or adjust the operation of the regenerative fuel cell 100.

In one implementation, the communication interface 712 can comprise different physical components and different communication methods for sending and receiving data between the communication device 102, the at least one powered device 200, and the user interface 400. In one example implementation, the communication interface 712 between the communication device 102 and the at least one powered device is electrical power wiring within a building. In addition, the communication interface 712 between the communication device 102 and the user interface 400 is the Internet.

The implementations of the present invention is not dependent on any particular device and can be implemented in various configurations and architectures.

Figure 8:
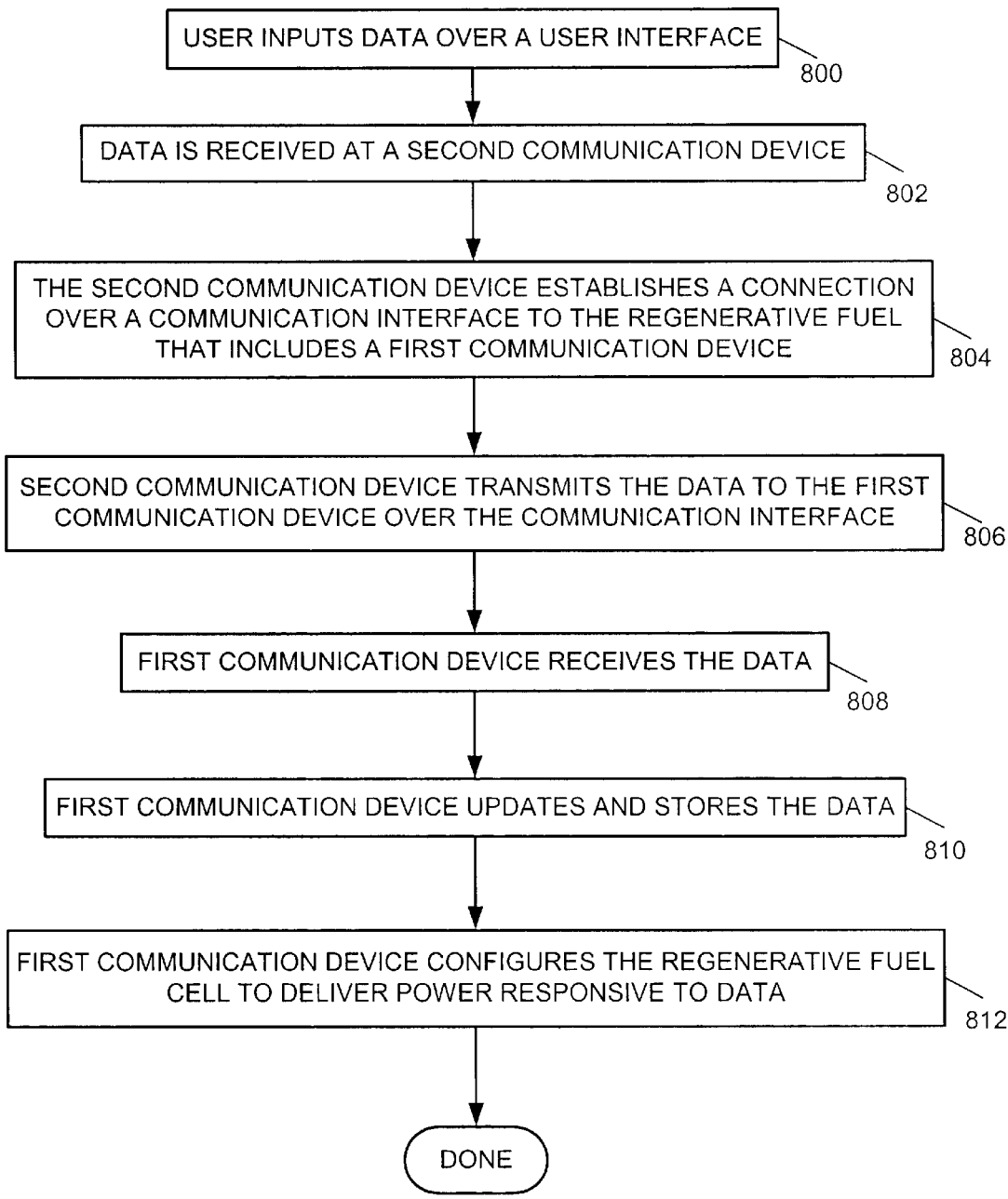
FIG. 8 is a flow diagram of an example method of the present invention for remotely monitoring and controlling the regenerative fuel cell.

FIG. 8 is a flow diagram of an exemplary method of the present invention for remotely monitoring and controlling the regenerative fuel cell 100. In step 800, user 406 inputs data over the input device 404 as illustrated in FIG. 4. The data input by the user 406 can be any information that will be used for monitoring and controlling the power management system. For example, the data can comprise control parameters for the regenerative fuel cell 100, control parameters for at least one powered device 200, control parameters for the at least one energy source 300, power usage parameters, or any other information for controlling the power management system.

In step 802, the data is received at the second communication device 402. In one implementation, the data can appear on the display of the second communication device 402. The data can be stored on the second communication device 402 for later retrieval. In step 804, the second communication device 402 establishes a connection over the communication interface 712 to the first communication device 102 as illustrated in FIG. 4.

In step 806, the second communication device 402 transmits the data to the first communication device 102 over the communication interface 712. In one implementation, the second communication device 402 will use an Internet web browser to transmit the data over the communication interface 712, which will be the Internet, to the first communication device 102.

In step 808, the first communication device 102 receives the data. In step 810, the first communication device 102 updates and stores the data. In one implementation, the first communication device 102 can update and store control parameters for the regenerative fuel cell 100, the at least one energy source 300, and/or the at least one powered device 200. The first communication device 102 can then use the stored control parameters to adjust power usage of the regenerative fuel cell 100 and/or at least one powered device 200. The first communication device 102 can also communicate the updated control parameters to the at least one powered device 200 and at least one source 300, which will be discussed further below.

In step 812, the first communication device 102 can use the data to configure the regenerative fuel cell 100 to deliver or receive power responsive to the data. In one implementation, the data can be control parameters instructing the regenerative fuel cell 100 to deliver power to at least one powered device 200 or at least one energy source 300 based on a certain criteria. For example, the criteria could be a cost range for the price of electricity. The cost range could be set so when the cost of electricity reaches a certain cost, the first communication device 102 will configure the regenerative fuel cell 100 to deliver power to at least one powered device 200 and/or at least one energy source 300 at a lower cost, rather than continuing to use electricity supplied by the Utility company 1100 at a higher cost. As illustrated in FIG. 12, the first communication device 102 can provide for the ability to communicate over the communication interface 712 with the Utility company 1100 to request the price of electricity or to retrieve power usage information. The first communication device 102 can then analyze that information and based on that information activate the regenerative fuel cell 100 to deliver power to the at least one powered device 200.

In another implementation, the data could be control parameters instructing the regenerative fuel cell 100 to deliver power to at least one energy source 300 based on a criteria. The at least one energy source 300 could be the regional electric grid, otherwise known as the "Utility company 1100." For example, the criteria could be a power usage range where the first communication device 102 detects that the Utility company 1100 has requested power delivery. The first communication device 102 could then supply excess generated power from the regenerative fuel cell 100 to the Utility company 1100 for a profit. Alternatively, the Utility company 1100 could communicate over the communication interface 712 with the first communication device 102 to request power delivery to the grid. The first communication device 102 could activate the regenerative fuel cell 100 and deliver power to the Utility company 1100 based on their request.

Figure 9:
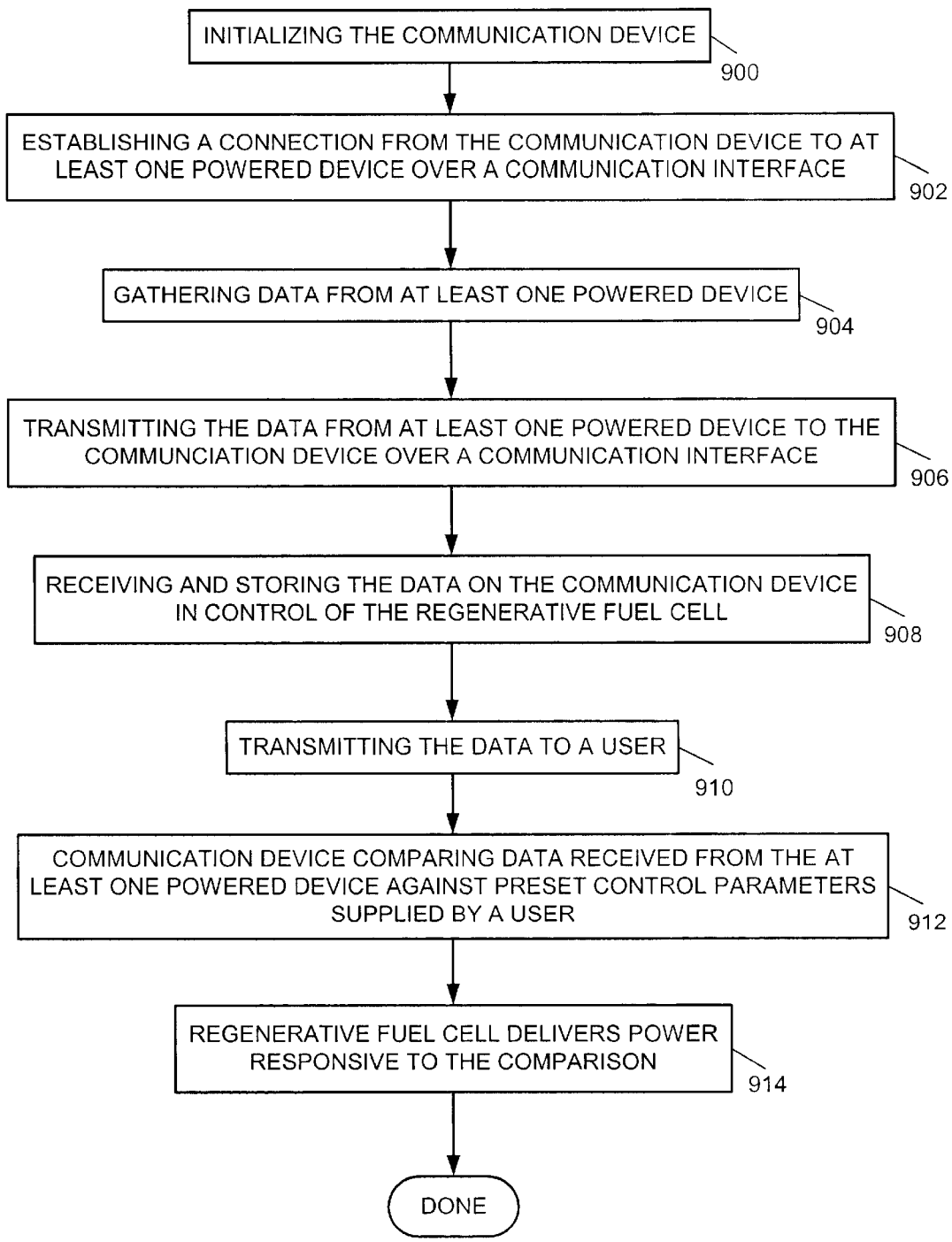
FIG. 9 is a flow diagram of an example method of the present invention for a communication device to monitor and control at least one powered device.

FIG. 9 is a flow diagram of an exemplary method of the present invention for a communication device 102 to monitor and control at least one powered device 200.

In step 900, the communication device 102 is initialized for sending and receiving data over the communication interface 712. In step 902, the communication device 102 establishes a connection to at least one powered device 200 over the communication interface 712 as illustrated in FIGS. 2 and 11. In one implementation, the communication device 102 will use an Internet web browser to transmit the data over the communication interface 712, which will be the Internet, to the at least one powered device 200. In another implementation, the communication device 102 will send and receive data through the electrical power wiring of a building. In another implementation, the communication device 102 will send and receive data via electromagnetic waves using a wireless system.

In step 904, the communication device 102 will gather data from at least one powered device 200. The data can be any information pertaining to the operation and control of the at least one powered device 200. For example, the data can comprise power usage information, environmental information, operating parameters, control parameters, or any other operational information.

In one implementation, the communication device 102 will send a request to the at least one powered device 200 over the communication interface 712 to receive data. Alternatively, the communication device 102 will send data to be stored on the at least one powered device 200 over the communication interface 712. In this implementation, the powered device 200 will have processing capability for sending, receiving, and storing data over the communication interface 712.

In another implementation, the at least one powered device 200 will have no processing capability. A smart adapter can be plugged into an electrical outlet and then the at least one powered device 200 plugged into the smart adapter. The smart adapter will have processing capability for sending, receiving, and storing data over the communication interface 712. The smart adapter can receive and store updated control parameters from the communication device 102 to adjust and monitor the power consumption of the at least one powered device 200. Therefore, the smart adapter becomes the processor for the at least one powered device 200.

In another implementation, the at least one powered device 200 will be a switch and have no processing capability. The switch can turn power on and off to other powered devices. The position of the switch (open or closed) will be controlled by the communication device 102 via the power interface 710 or communication interface 712.

In one implementation, the at least one powered device 200 can request and gather information from other powered devices. For example, the communication device 102 can request information from a environmental control system located in a building. Once the environmental control system receives that request, the environmental control system can then request information from other powered devices 200 within the system such as an air conditioner, heater, ventilation system, and other similar powered devices. This implementation will be discussed in further detail below.

In step 906, the at least one powered device 200 will process the data request from the communication device 102 by transmitting the data from at least one powered device 200 to the communication device 102 over a communication interface 712. In step 908, the communication device 102 in control of the regenerative fuel cell 100 will receive the data and store the data on the communication device 102. The communication device 102 can be integrated with the regenerative fuel cell 100 by physical incorporation or a direct connection.

In step 910, the data can optionally be transmitted through at least one other communication device to a user. In one implementation, the other communication devices can be the same as the second communication device 402 as illustrated in FIGS. 4 and 11. All implementations and embodiments for the second communication device 402 can be considered the same as for the at least one other communication device. The at least one other communication device can display and store the data for later retrieval. A user 406 can utilize software on the other communication device to process the data for cost analysis and savings or operational improvement.

In step 912, the communication device 102 can compare the data received in step 906 from the at least one powered device 200 against preset control parameters supplied by a user. The preset control parameters could be supplied to the communication device 102 in the method set forth above in the FIG. 8 flow diagram process. The communication device 102 can use any form of comparison method that will result in an analysis of the data. The preset control parameters can help the communication device 102 determine if the at least one powered device 200 is operating within the proper operating range. For example, if the preset control parameters were the temperature for at least one powered device 200, then the communication device 102 can use the data sent from the powered device 200 to determine if the powered device is operating at the proper temperature.

In one implementation example, the at least one powered device 200 could be a commercial meat freezer with processing capability that the communication device 102 can monitor and control. The communication device 102 could request the freezer's power usage, temperature, light usage, and other related operating information. The communication device 102 could also periodically request the current price of electricity from the Utility company 1100 under a time-of-day pricing agreement wherein the price of electricity varies each hour. In response to that information and the preset control parameters received from the user 406, the communication device 102 could then adjust all of those parameters each independently by sending instructions to the freezer to make changes in the operation of the freezer.

For example, the user 406 may input the following preset control parameters for the freezer temperature: maintain at 0° F. unless the cost of electricity exceeds 0.15/kWh, in which case allow the temperature to rise to 5° F., except on Mondays from 5 AM to noon, when the temperature should be held at minus 5° F. regardless of cost, because new meat shipments arrive every Monday at 5 AM. The lights in the freezer should be kept on from midnight to 4 PM Monday through Friday and turned off at other times. The communication device 102 would then control the operation of the freezer accordingly.

In one implementation example, the communication device 102 can act as the main control for a security system. Sensors, locking mechanisms, and surveillance equipment could be connected to the communication device 102 for direct monitoring and control. Alternatively, the communication device 102 could monitor and control an existing main control for a security system.

In step 914, the commination device 102 will have completed the comparison performed in step 912. If the communication device 102 determines that it is needed, the communication device 102 can activate the regenerative fuel cell 100 to supply power to at least one powered device 200. For example, if power to the at least one powered device 200 stops, the communication device 102 can activate the regenerative fuel cell 100 to supply power to the powered device 200. The communication device 102 can also supply power to at least one powered device 200 when the communication device determines that the electricity being delivered by from the regional grid system is not reliable or is too expensive.

For example, in the commercial meat freezer implementation above, the user 406 may preset an additional parameter telling the communication device 102 to activate the regenerative fuel cell to supply power to the freezer when the cost of electricity exceeds $0.20/kWh from the Utility company 1100 and to receive power for fuel regeneration when the cost of electricity is less than $0.10/kWh.

In one implementation, the method further comprises the steps of receiving the updated control parameters by at least one powered device 200, sending the updated control parameters from the powered device 200 to other powered devices, and adjusting operation to perform within the updated control parameter. In an implementation example, the at least one powered device 200 could be the main control for a security system within a building. The main control can receive updated control parameters from the communication device 102 over the communication interface 712. The main control can then send the updated control parameters to other sub-components of the security system for adjusting operation to perform within the updated control parameters. For example, the main control can receive a command to turn the lights off at a certain time and to activate the motion detectors, the main control can then turn the lights off at that time and activate the motion detectors or instruct controllers to turn the lights off and activate the motion detectors at a certain time.

In another implementation, a user 406 could have the ability to remotely monitor and control at least one powered device 200 by communicating over the communication interface 712 with the communication device 102. The user 406 could input parameters for controlling all aspects of at least one powered device 200 including power usage, communication, or other related items.

Figure 10:
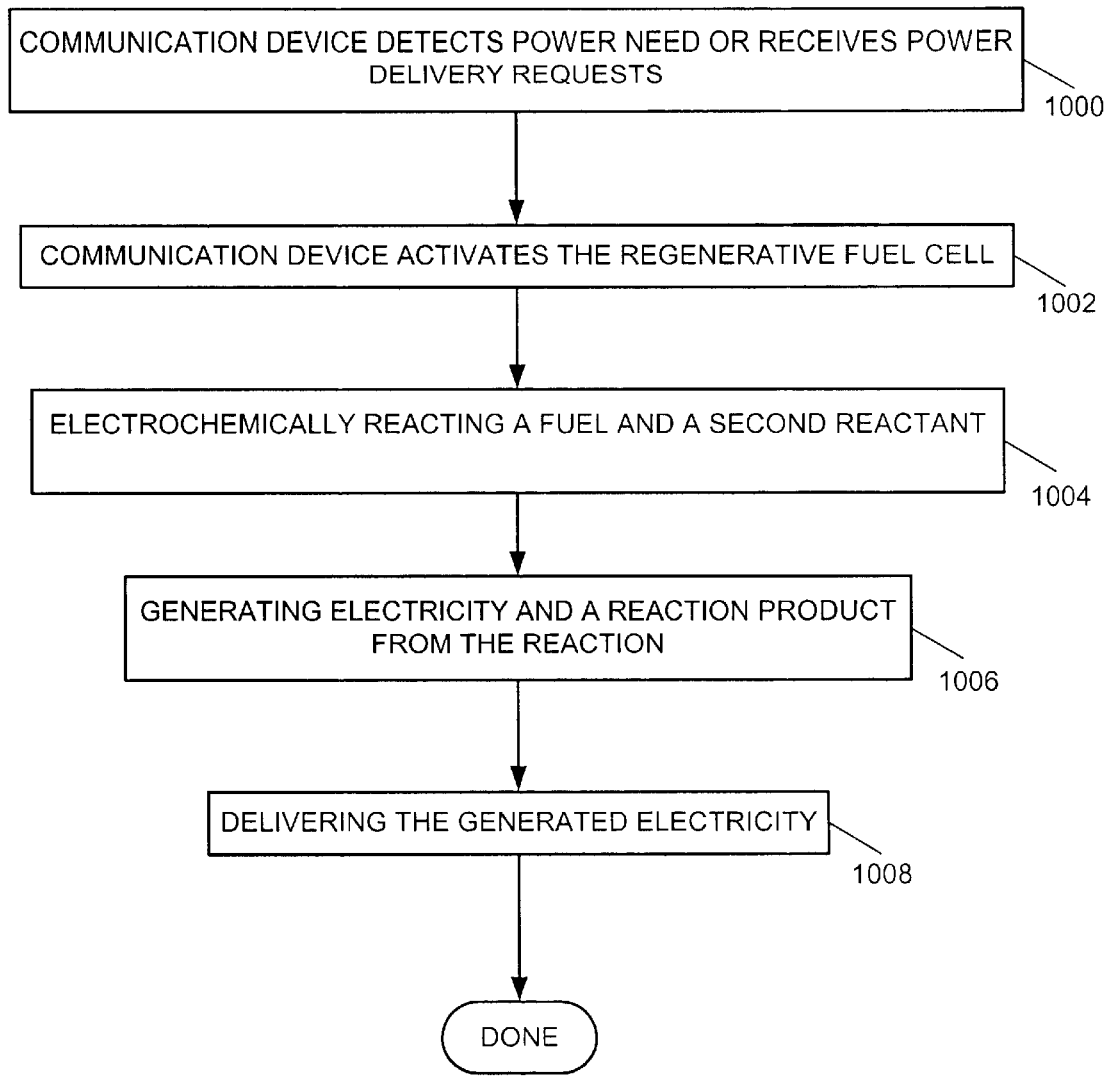
FIG. 10 is a flow diagram of an example method of the present invention for monitoring and controlling a regenerative fuel cell and at least one powered device through the use of a communication device, the communication device monitors for power delivery requests.

FIG. 10 is a flow diagram of an exemplary method of the present invention for monitoring and controlling a regenerative fuel cell 100 and at least one powered device 200 through the, use of a communication device 102, the communication device monitors for power delivery requests. The implementations and implementation examples along with the detailed discuss above for the first embodiment is hereby incorporated into the description of this method.

In step 1000, the communication device 102 detects a power need or receives power delivery requests as illustrated in FIG. 13. The power need or power delivery requests can be received over the communication interface 712. The communication device 102 can detect a power need from the control parameter comparison or by sensors or components that will notify the communication device 102 of power need or loss. A power delivery request will notify the communication device 102 to activate the regenerative fuel cell 100 to deliver power to the requesting device. The power delivery request can come from any device connected to the power management system. For example, at least one powered device 200 or at least one energy source 300 can make power delivery requests. Alternatively, a user 406 could make a power delivery request directly to the communication device 102 as illustrated in FIG. 4. The user 406 could instruct the communication device 102 to initiate the regenerative fuel cell 100 to deliver power. The user 406 could be the Utility company 1100 making a direct request for power delivery to at least one powered device 200 or to the regional utility grid.

In step 1002, the communication device 102 activates the regenerative fuel cell 100 by commands. In step 1004, the fuel is combined with a second reactant for electrochemically reacting. In step 1006, electricity is generated and a reaction product is produced from the reaction. In step 1008, the generated electricity is delivered.

In one implementation, the regenerative fuel cell 100 provides reliable electricity to auxiliary electric devices such as a radio, TV, mobile phone, facsimile machine, air conditioner, microwave, or other related electrical devices onboard a vehicle such as a truck, recreational vehicle, boat, or car. In this configuration, the regenerative fuel cell 100 could be connected to the vehicle's alternator or to a solar panel on the roof or deck of the vehicle to accept DC current. The regenerative fuel cell 100 would use the supplied DC current to power the processes for electricity generation and fuel regeneration. Alternatively, the regenerative fuel cell 100 could be configured to completely power the vehicle without the need for DC current from a vehicle's alternator. The regenerative fuel cell 100 could propel the vehicle with zero-emissions and when parked be refueled or plugged in to at least one energy source 300 to regenerate the fuel.

In one implementation example, the regenerative fuel cell 100 could be used to power auxiliary devices onboard a sleeper cab on a long-haul Class 8 truck when the truck is parked for loading, unloading, and driver rest periods. The fuel could be regenerated while the truck is moving using DC electricity generated by the truck's alternator. In another implementation example, the regenerative fuel cell 100 could be used to power auxiliary devices onboard a sailboat or yacht when the boat is anchored away from port at night. The fuel could be regenerated during the day using a solar panel on the deck of the boat or by DC electricity generated by an alternator when the yacht's main engines are running.

In another implementation, the power management system may incorporate an electricity meter, thereby making it a useful replacement for present electricity meters. The electric meter can be in communication with the communication device 102 included with the regenerative fuel cell 100 and at least one powered device 200. The electric meter in this configuration can be used to determine an electric bill along with other useful information.

In another implementation, the power management system may incorporate a system for recovering waste heat from the regenerative fuel cell 100 and using the waste heat to heat air or water.

While embodiments, implementations, and implementation examples have been shown and described, it should be apparent that there are many more embodiments, implementations, and implementation examples that are within the scope of the subject invention. Accordingly, the invention is not to be restricted, except in light of the appended claims and their equivalents.

We claim:

1. A system for power management, comprising:
    (a) a regenerative fuel cell; and
    (b) a communication interface configured to allow communication of data between said regenerative fuel cell and at least one external device powered by the fuel cell, wherein the regenerative fuel cell is configured to deliver power to said device responsive to one or more parameters received from the at least one external device over the interface.

2. The system as in claim 1, wherein the regenerative fuel cell comprises a fuel storage unit for storing fuel, a fuel cell for electrochemically reacting the fuel with a second reactant to release electricity, a reaction product storage unit for storing reaction product resulting from the reaction, and a fuel regenerator for electrochemically recovering the fuel from the reaction product.

3. The system as in claim 2, wherein the regenerative fuel cell further comprises a second reactant storage unit.

4. The system as in claim 2, wherein the fuel regenerator is the fuel cell.

5. The system as in claim 2, further comprising a system for inserting and removing quantities of the fuel.

6. The system as in claim 2, further comprising a system for inserting and removing quantities of the second reactant.

7. The system as in claim 2, further comprising a system for inserting and removing quantities of the reaction product.

8. The system as in claim 2, wherein the fuel is hydrogen.

9. The system as in claim 2, wherein the fuel is zinc.

10. The system as in claim 2, wherein the second reactant is oxygen.

11. The system as in claim 2, wherein at least one of the fuel storage unit, the second reactant storage unit, or the reaction product storage unit can simultaneously store an electrolyte.

12. The system as in claim 1 further comprising a communication device which monitors the regenerative fuel cell.

13. The system as in claim 1 further comprising a communication device which controls the regenerative fuel cell to deliver or receive power responsive to data received over the interface.

14. The system as in claim 1, in combination with at least one powered device.

15. The system as in claim 14, wherein the at least one powered device is powered at least in part by the regenerative fuel cell.

16. The system as in claim 14 further comprising a communication device, wherein the communication device monitors the at least one powered device.

17. The system as in claim 14, wherein the at least one powered device includes a communication device for sending and receiving data over the communication interface.

18. The system as in claim 14, wherein the at least one powered device can monitor and control other powered devices.

19. The system as in claim 14, wherein the at least one powered device is selected from the group comprising an energy usage system, security system, environmental system, commercial devices, consumer devices, industrial devices, manufacturing devices, vehicles, automobiles, trucks, trailer, recreational vehicle, motorcycle, smart appliances, household appliances, engines, computers, telecommunication equipment, cellular base stations, distributed terminals, sensors, electrical devices located onboard a vehicle, or any electric powered device.

20. The system as in claim 1 further comprising a communication device which can send data to and receive data from at least one selected from the group comprising at least one powered device or at least one energy source.

21. The system as in claim 1 further comprising a communication device which can send data to and receive data from at least one other communication device.

22. The system as in claim 21, wherein the at least one other communication device is selected from the group comprising a computer, server system, mainframe, laptop, PDA (personal digital assistant), handheld computer, mobile phone, facsimile machine, telephone, or video phone.

23. The system as in claim 21, wherein the at least one other communication device has a graphical user interface.

24. The system as in claim 23, wherein the graphical user interface is an Internet web browser.

25. The system as in claim 1 further comprising a communication device, wherein the communication device is directly connected to the regenerative fuel cell.

26. The system as in claim 1 further comprising a communication device, wherein the communication device is a processor coupled to memory.

27. The system as in claim 1 further comprising a communication device, wherein the communication device is at least one selected from the group comprising of a computer, laptop, handheld computer, PDA (personal digital assistant), mainframe, server system, mobile phone, or any other similar device.

28. The system as in claim 1, wherein the communication device is configured to track power usage information for at least one apparatus selected from the group comprising a regenerative fuel cell, at least one powered device, or at least one energy source.

29. The system as in claim 1, wherein the system is configured to deliver and receive power over a power interface.

30. The system as in claim 29, wherein the communication interface and the power interface are the same interface.

31. The system as in claim 29, wherein the communication interface and power interface are different interfaces.

32. The system as in claim 1, wherein the communication interface is a computer network.

33. The system as in claim 1, in combination with at least one energy source for supplying power.

34. The system as in claim 33 further comprising a communication device, wherein the communication device is in communication with the at least one energy source.

35. The system as in claim 33, wherein the at least one energy source is selected from the group comprising a reciprocating engine, combustion engine, regional electric grid, rotating engine, solar energy collector, battery, generator, turbine, water wheel, flywheel, capacitor, or wind energy collector.

36. The system of claim 33, in combination with at least one powered device, wherein the at least one energy source is configured to supply primary power to the at least one powered device.

37. The system of claim 33, wherein the regenerative fuel cell is configured to supply backup power to the at least one powered device.

38. The system as in claim 33, wherein the at least one energy source is configured to supply power to at least one apparatus selected from the group comprising a fuel regenerator, regenerative fuel cell, or communication device.

39. The system as in claim 1, further comprising a system for recovering waste heat from the regenerative fuel cell and using the waste heat to heat air or water.

40. The system as in claim 1, further comprising an electric meter.

41. The system as in claim 40 further comprising a communication device, herein the electric meter is in communication with the communication device.

42. The system as in claim 40, wherein the electric meter can be used to determine an electric bill.

43. A system for power management, comprising:
 (a) a regenerative fuel cell;
 (b) a communication interface configured to allow communication of data between said regenerative fuel cell and at least one external device, wherein the regenerative fuel cell is configured to deliver or receive power responsive to one or more parameters received from the at least one external device over the interface; and
 (c) a communication device incorporated into the physical structure of the regenerative fuel cell.

44. A system for power management, comprising:
 (a) a regenerative fuel cell;
 (b) a communication interface configured to allow communication of data between said regenerative fuel cell and at least one external device, wherein the regenerative fuel cell is configured to deliver or receive power responsive to one or more parameters received from the at least one external device over the interface; and
 (c) a communication device comprising a processor coupled to a memory, and also comprising a display, and an input device.

45. A system for power management, comprising:
 (a) a regenerative fuel cell; and
 (b) a communication interface configured to allow communication of data between said regenerative fuel cell and at least one external device, wherein the regenerative fuel cell is configured to deliver or receive power responsive to one or more parameters received from the at least one external device over the interface, and the communication interface is an internet.

46. A system for power management, comprising:
 (a) a regenerative fuel cell; and
 (b) a communication interface configured to allow communication of data between said regenerative fuel cell and at least one external device, wherein the regenerative fuel cell is configured to deliver or receive power responsive to one or more parameters received from the at least one external device over the interface, and the communication interface is a wireless based system.

47. The system as in claim 46, wherein the wireless based system is selected from the group comprising a cellular based, digital cellular, GSM (Global System for Mobile communication), PCS (personal communications services), PDC (personal digital cellular), radio communications, or satellite communications system.

48. The system as in claim 46, wherein the wireless based system is configured to utilize either a WAP (wireless application protocol) or a bluetooth wireless technology standard for sending and receiving data over the communication interface.

49. A system for power management, comprising:
 (a) a regenerative fuel cell; and
 (b) a communication interface configured to allow communication of data between said regenerative fuel cell and at least one external device, wherein the regenerative fuel cell is configured to deliver or receive power responsive to one or more parameters received from the at least one external device over the interface, and the communication interface is a land-line based system.

50. The system as in claim 49, wherein the land-line based system is selected from the group comprising a local area network, wide area network, ISDN (integrated services digital network), DSL (digital subscriber line), xDSL (ADSL, HDSL, RADSL), Internet Cable, cable modem, PPP (point-to-point protocol) connections, modem, telephone lines, or electrical wiring.

51. A system for power management, comprising:
   (a) a regenerative fuel cell;
   (b) a communication interface configured to allow communication of data between said regenerative fuel cell and at least one external device, wherein the regenerative fuel cell is configured to deliver or receive power responsive to one or more parameters received from the at least one external device over the interface; and
   (c) a system for allowing electricity generated by the regenerative fuel cell to be delivered to the regional electric grid.

52. A system for power management, comprising:
   (a) a regenerative fuel cell;
   (b) a communication interface configured to allow communication of data between said regenerative fuel cell and at least one external device, wherein the regenerative fuel cell is configured to deliver or receive power responsive to one or more parameters received from the at least one external device over the interface; and
   (c) an electric meter.

53. A system for power management, comprising:
   (a) a regenerative fuel cell;
   (b) at least one powered device;
   (c) a communication interface configured to allow communication of data between the regenerative fuel cell and the at least one powered device; and
   (d) a user interface for communicating data between a user and the regenerative fuel cell, wherein the regenerative fuel cell is configured to deliver power to the at least one powered device responsive to data originating with the user.

54. The system as in claim 53, wherein the regenerative fuel cell comprises a fuel storage unit for storing fuel, a fuel cell for electrochemically reacting the fuel with a second reactant to release electricity, a reaction product storage unit for storing reaction product resulting from the reaction, and a fuel regenerator for electrochemically recovering the fuel from the reaction product.

55. The system as in claim 54, wherein the regenerative fuel cell further comprises a second reactant storage unit.

56. The system as in claim 54, wherein the fuel regenerator is the fuel cell.

57. The system as in claim 54, further comprising a system for inserting and removing quantities of at least one selected from the group comprising the fuel, the second reactant, or the reaction product.

58. The system as in claim 53 further comprising a communication device, wherein the communication device is incorporated into the regenerative fuel cell.

59. The system as in claim 53 further comprising a communication device, wherein the communication device is directly connected to the regenerative fuel cell.

60. The system as in claim 53 further comprising a communication device, wherein the communication device is a processor coupled to memory.

61. The system as in claim 60, wherein the communication device further comprises a display with an input device.

62. The system as in claim 53 further comprising a communication device, wherein the communication device is selected from the group comprising a computer, laptop, handheld computer, PDA (personal digital assistant), mainframe, server system, mobile phone, or any other similar device.

63. The system as in claim 53 further comprising a communication device, wherein the communication device is configured to track power usage information for at least one apparatus selected from the group comprising a regenerative fuel cell, at least one powered device, or at least one energy source.

64. The system as in claim 53, wherein the system is configured to deliver and receive power over a power interface.

65. The system as in claim 64, wherein the communication interface and the power interface are the same interface.

66. The system as in claim 64, wherein the communication interface and power interface are different interfaces.

67. The system as in claim 53, wherein the communication interface is a computer network.

68. The system as in claim 53, wherein the communication interface is a wireless based system.

69. The system as in claim 68, wherein the wireless based system is selected from the group comprising a cellular based, digital cellular, GSM (Global System for Mobile communication), PCS (personal communications services), PDC (personal digital cellular), radio communications, or satellite communications system.

70. The system as in claim 68, wherein the wireless based system is configured to utilize either a WAP (wireless application protocol) or a bluetooth wireless technology standard for sending and receiving data over the communication interface.

71. The system as in claim 53, wherein the communication interface is a land-line based system.

72. The system as in claim 71, wherein the land-line based system is selected from the group comprising a local area network, wide area network, ISDN (integrated services digital network), DSL (digital subscriber line), xDSL (ADSL, HDSL, RADSL), Internet Cable, cable modem, PPP (point-to-point protocol) connections, modem, telephone lines, or electrical wiring.

73. The system as in claim 53 further comprising first and second communication devices, wherein the first communication device communicates with the at least one powered device and the second communication device over different implementations of the communication interface.

74. The system as in claim 53, wherein the at least one powered device can monitor and control other powered devices.

75. The system as in claim 53, wherein the at least one powered device is selected from the group comprising an energy usage system, security system, environmental system, commercial devices, consumer devices, industrial devices, manufacturing devices, vehicles, automobiles, trucks, trailer, recreational vehicle, motorcycle, smart appliances, household appliances, engines, computers, telecommunication equipment, cellular base stations, distributed terminals, sensors, electrical devices located onboard a vehicle, or any electric powered device.

76. The system as in claim 53, in combination with at least one energy source for supplying power.

77. The system as in claim 76, wherein the at least one energy source is selected from the group comprising a reciprocating engine, combustion engine, regional electric grid, rotating engine, solar energy collector, battery, generator, turbine, water wheel, flywheel, capacitor, or wind energy collector.

78. The system as in claim 53 further comprising a communication device within the user interface which is selected from the group comprising a computer, server system, mainframe, laptop, PDA (personal digital assistant), handheld computer, mobile phone, facsimile machine, telephone, or video phone.

79. The system as in claim 53 further comprising a communication device within the user interface, wherein the communication device has a graphical user interface.

80. The system as in claims 79, wherein the graphical user interface is an Internet web browser.

81. The system as in claim 53, wherein the user interface includes a manual entry device selected from the group comprising a keyboard, keypad, pointing device, input device, mouse, light pen, remote control, shortcut buttons or any other related entry device.

82. The system as in claim 53, wherein the user interface includes a voice recognition system for receiving voice information from a user speaking into a microphone, and translating the voice information into digital information.

83. The system as in claim 53, wherein the user interface includes neural attachments secured to a user's brain which are configured to translate electrical impulses from the brain into digital information.

84. The system as in claim 53, further comprising a system for recovering waste heat from the regenerative fuel cell and using the waste heat to heat air or water.

85. The system as in claim 53, further comprising an electric meter.

86. A system for power management, comprising:
    (a) a regenerative fuel cell;
    (b) at least one powered device;
    (c) a communication interface configured to allow communication of data between the regenerative fuel cell and the at least one powered device, wherein the communication interface is an internet; and
    (d) a user interface for communicating data between a user and the regenerative fuel cell, wherein the regenerative fuel cell is configured to deliver power to the at least one powered device responsive to data originating with the user.

87. A system for power management by monitoring and controlling a regenerative fuel cell and at least one powered device, comprising:
    (a) a regenerative fuel cell comprising a fuel storage unit for storing fuel, a fuel cell for electrochemically reacting the fuel with a second reactant to release electricity, a reaction product storage unit for storing reaction product resulting from the reaction, a fuel regenerator for electrochemically recovering the fuel from the reaction product, and an optional second reactant storage unit;
    (b) at least one interface comprising a communication interface and a power interface, wherein data can be sent and received over the communication interface and electricity can be sent and received over the power interface;
    (c) a communication device configured for monitoring and controlling the regenerative fuel cell, wherein the communication device can communicate with the at least one powered device over the communication interface;
    (d) at least one powered device that is electric consuming;
    (e) at least one energy source in communication with the communication device, the at least one energy source providing electricity to the regenerative fuel cell and at least one powered device, wherein the regenerative fuel cell can provide electricity to the at least one energy source; and
    (f) a user interface for exchanging information between a user and the cell or device.

88. A method for remotely controlling a regenerative fuel cell, comprising:
    (a) inputting data over a user interface;
    (b) providing the data to a communication device over a communication interface, wherein the communication device monitors and controls the regenerative fuel cell; and
    (c) configuring the regenerative fuel cell to deliver power responsive to the data.

89. The method as in claim 88, wherein the data comprises control parameters for the regenerative fuel cell.

90. The method as in claim 88, wherein the communication interface is a wireless interface.

91. The method as in claim 88, wherein the communication interface is an internet.

92. A method of monitoring at least one powered device, comprising:
    (a) gathering data from at least one powered device being powered by a regenerative fuel cell;
    (b) transmitting the data from the at least one powered device to a regenerative fuel cell over a communication interface; and
    (c) receiving and storing the data on a communication device in control of the regenerative fuel cell.

93. The method as in claim 92, wherein the data is selected from a group comprising power usage information, environmental information, operating parameters, or control parameters.

94. A method of monitoring at least one powered device, comprising:
    (a) gathering data from at least one powered device being powered by a regenerative fuel cell;
    (b) transmitting the data from the at least one powered device to a regenerative fuel cell over a communication interface;
    (c) receiving and storing the data on a communication device in control of the regenerative fuel cell; and
    (d) transmitting the data to a user.

95. A method of monitoring at least one powered device, comprising:
    (a) gathering data from at least one powered device being powered by a regenerative fuel cell;
    (b) transmitting the data from the at least one powered device to a regenerative fuel cell over a communication interface;
    (c) receiving and storing the data on a communication device in control of the regenerative fuel cell; and
    (d) comparing the data against preset control parameters supplied by a user.

96. The method as in claim 95, further comprising the step of delivering power to the powered device responsive to the data.

97. The method as in claim 95, further comprising the steps of:
    (a) receiving the updated control parameters by at least one powered device;
    (b) sending the updated control parameters from the powered device to other powered devices; and
    (c) adjusting operation to perform within the updated control parameters.

98. A method of monitoring and controlling a zinc regenerative fuel cell and at least one powered device comprising:

(a) receiving power delivery requests;

(b) activating the zinc regenerative fuel cell by commands from the communication device;

(c) electrochemically reacting a fuel and a second reactant;

(d) generating electricity and a reaction product from the reaction; and e) delivering the generated electricity.

99. A system for power management, comprising:

(a) a regenerative fuel cell; and (b) a communication device configured to (1) receive data from a source; and (2) manage, responsive to the data, providing power from one or the other of an energy source and the regenerative fuel cell to one or more powered devices.

100. The system of claim 99 wherein the communication device is configured to operatively engage, responsive to the data, one or the other of the energy source and the regenerative fuel cell to provide power to the one or more powered devices.

101. The system of claim 99 wherein the source of data is an energy source.

102. The system of claim 99 wherein the source of data is a powered device.

103. The system of claim 99 wherein the source of data is a user input device.

104. The system of claim 99 wherein the source of data is an external device.

105. The system of claim 99 wherein the communication device is configured to operatively engage the regenerative fuel cell to provide power to the one or more powered devices during peak usage periods, and operatively engage an energy source to provide power to the one or more powered devices during off-peak usage periods.

106. A method of providing power to one or more loads, comprising:

(a) receiving data from a source; and (b) managing, responsive to the data, providing power from one or the other of an energy source and a regenerative fuel cell to one or more powered devices.

107. The method of claim 106 wherein the managing step comprises operatively engaging, responsive to the data, one or the other of an energy source and a regenerative fuel cell to provide power to the one or more powered devices.

108. The method of claim 106 wherein the data is received from the energy source.

109. The method of claim 106 wherein the data is received from one or more of the powered devices.

110. The method of claim 106 the data is received from a user input device.

111. The method of claim 106 wherein the data is received from an external source.

112. The method of claim 111 wherein the external source is an internet site.

113. The method of claim 106 further comprising storing the data in a memory.

114. The method of claim 106 further comprising operatively engaging the energy source to provide power to the one or more powered devices during off-peak usage periods, and operatively engaging the regenerative fuel to provide power to the one or more powered devices during peak usage periods.

* * * * *